United States Patent
Kano et al.

(10) Patent No.: US 10,532,765 B2
(45) Date of Patent: Jan. 14, 2020

(54) CONTROL APPARATUS FOR THREE-PHASE ROTARY MACHINE, AND ELECTRIC POWER STEERING APPARATUS

(71) Applicant: DENSO CORPORATION, Kariya, Aichi-pref. (JP)

(72) Inventors: Ryo Kano, Kariya (JP); Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/077,887

(22) PCT Filed: Jan. 13, 2017

(86) PCT No.: PCT/JP2017/000939
§ 371 (c)(1),
(2) Date: Aug. 14, 2018

(87) PCT Pub. No.: WO2017/141593
PCT Pub. Date: Aug. 24, 2017

(65) Prior Publication Data
US 2019/0047613 A1    Feb. 14, 2019

(30) Foreign Application Priority Data

Feb. 17, 2016    (JP) .................................. 2016-27672

(51) Int. Cl.
*B62D 5/04*        (2006.01)
*H02P 25/22*       (2006.01)
(Continued)

(52) U.S. Cl.
CPC ........ *B62D 5/0463* (2013.01); *B60R 16/0232* (2013.01); *B62D 5/046* (2013.01);
(Continued)

(58) Field of Classification Search
CPC ........ B62D 5/04; B62D 5/046; B62D 5/0463; B62D 6/00; B60R 16/0232; H02P 25/03;
(Continued)

(56) References Cited

U.S. PATENT DOCUMENTS 5,475,289 A * 12/1995 McLaughlin .......... B62D 5/046
                                                        180/446
5,743,351 A *  4/1998 McLaughlin .......... B62D 5/0463
                                                        180/446
(Continued)

FOREIGN PATENT DOCUMENTS

DE     60208958 T8 *  2/2007 ........... B62D 5/0463
EP     1308368 A2  *  5/2003 ........... B62D 5/0463
(Continued)

*Primary Examiner* — Cuong H Nguyen
(74) *Attorney, Agent, or Firm* — Knobbe, Martens, Olson & Bear, LLP

(57) ABSTRACT

A control apparatus (10) for controlling a three-phase rotary machine (80) having two three-phase winding sets (801, 802) includes: two power converters (601, 602) outputting AC currents, having a same amplitude and a phase difference of (30±60×n) [deg], to the two winding sets; a harmonic component generator (20) superimposing a harmonic component on a phase current first harmonic component of a current command value; and two controllers (331, 332) calculating voltage command values for the two power converters according to the current command value. A combination of amplitudes of the phase current fifth and seventh harmonic components to reduce a peak of the phase current first harmonic component is defined as a fundamental amplitude. The harmonic component generator performs a harmonic amplitude reduction process to reduce a phase current peak reduction amount of the phase current first harmonic component from the fundamental amplitude according to a predetermined parameter, and to reduce an absolute value of an amplitude of the harmonic component.

14 Claims, 12 Drawing Sheets

(51) Int. Cl.
 *B62D 6/00* (2006.01)
 *H02P 27/06* (2006.01)
 *H02P 25/03* (2016.01)
 *H02P 29/032* (2016.01)
 *B60R 16/023* (2006.01)
 *H02P 29/50* (2016.01)

(52) U.S. Cl.
 CPC ............... *B62D 6/00* (2013.01); *H02P 25/03* (2016.02); *H02P 25/22* (2013.01); *H02P 27/06* (2013.01); *H02P 29/032* (2016.02); *H02P 29/50* (2016.02)

(58) Field of Classification Search
 CPC ........ H02P 25/22; H02P 27/06; H02P 29/032; H02P 29/50
 USPC ...................... 701/41; 318/629, 689; 363/39; 180/6.44
 See application file for complete search history.

(56) References Cited

U.S. PATENT DOCUMENTS

| | | | | |
|---|---|---|---|---|
| 6,639,379 | B2 * | 10/2003 | Matsushita | B62D 5/046 180/410 |
| 6,694,238 | B2 * | 2/2004 | Ishihara | B62D 5/0463 180/6.2 |
| 7,161,323 | B2 * | 1/2007 | Ajima | B62D 5/046 318/560 |
| 7,782,000 | B2 * | 8/2010 | Suzuki | B62D 5/0484 180/443 |
| 9,214,886 | B2 * | 12/2015 | Suzuki | H02P 21/12 |
| 2003/0109974 | A1 * | 6/2003 | Ishihara | B62D 5/0463 701/41 |
| 2006/0009893 | A1 * | 1/2006 | Suzuki | B62D 5/046 701/41 |
| 2006/0038531 | A1 | 2/2006 | Wakabayashi et al. | |
| 2006/0071628 | A1 | 4/2006 | Ta et al. | |
| 2008/0018277 | A1 | 1/2008 | Ta et al. | |
| 2008/0018278 | A1 | 1/2008 | Ta et al. | |
| 2011/0025240 | A1 | 2/2011 | Furukawa et al. | |
| 2014/0062375 | A1 * | 3/2014 | Suzuki | H02P 21/12 318/496 |
| 2016/0126877 | A1 | 5/2016 | Endoh | |
| 2016/0315577 | A1 | 10/2016 | Suzuki | |

FOREIGN PATENT DOCUMENTS

| | | | | |
|---|---|---|---|---|
| EP | 1308368 B1 * | 2/2006 | ............ | B62D 5/0463 |
| EP | 1612924 A3 * | 8/2012 | ............ | B62D 5/046 |
| JP | 2005-328691 A | 11/2005 | | |
| JP | 3804686 B2 | 8/2006 | | |
| JP | 2009-17707 A | 1/2009 | | |
| JP | 4422567 B2 * | 2/2010 | ............ | B62D 5/046 |
| JP | 4483298 B2 | 6/2010 | | |
| JP | 2011-035991 A | 2/2011 | | |
| JP | 2014-050150 A | 3/2014 | | |
| JP | 2014050150 A * | 3/2014 | ............ | H02P 21/12 |
| JP | 2014-121189 A | 6/2014 | | |
| JP | 5672278 B2 | 2/2015 | | |

* cited by examiner

CONTROL APPARATUS FOR THREE-PHASE ROTARY MACHINE, AND ELECTRIC POWER STEERING APPARATUS

CROSS REFERENCE TO RELATED APPLICATION

This application is based on Japanese Patent Application No. 2016-27672 filed on Feb. 17, 2016, the disclosure of which is incorporated herein by reference.

TECHNICAL FIELD

The present disclosure relates to a control apparatus for a three-phase rotary machine and to an electric power steering apparatus.

BACKGROUND ART

A technique to superimpose a harmonic component on a fundamental wave component (i.e., a phase current first harmonic component) of a voltage or a current has been used in a drive control apparatus for a three-phase rotary machine having a three-phase winding set. For example, Patent Literature 1 discloses a technique to compute a voltage command by superimposing harmonic components, such as fifth and seventh harmonic components, on a fundamental wave component in a drive apparatus for a multi-winding motor having two three-phase winding sets.

PRIOR ART LITERATURES

Patent Literature

Patent Literature 1: JP-2014-121189-A

SUMMARY

A drive control apparatus described in Patent Literature 1 focuses attention on enhancement of a motor output regarding optimal values of amplitude and a phase of a harmonic component with respect to a fundamental wave component and evaluates a ratio of the fundamental wave component which increases from 100% according to amplitude and a phase of a harmonic component.

However, due to a limited installation space, high radiation performance is required for a control apparatus for a three-phase rotary machine applied to, for example, an electric power steering apparatus. A reduction of heat generation is more crucial particularly during zero rotation or low-speed rotation of the three-phase rotary machine because a current is concentrated at a switching element of a particular phase in a power converter. It is therefore effective to reduce a phase current peak by superimposing a harmonic component on the phase current first harmonic component.

Meanwhile, when a harmonic component having large amplitude is superimposed on the phase current first harmonic component, a torque ripple and accompanying noises and vibrations readily occur. A computation load applied on a control unit increases, too. That is, superimposition of a harmonic component has a tradeoff relationship between a problem relating to a reduction of heat generation and a loss by reducing a phase current peak and a problem relating to a reduction of a torque ripple and a reduction of a computation load. Such being the case, the control apparatus is required to perform appropriate processing by discriminating a case where a phase current peak is reduced preferentially from other cases depending on an operating state of the three-phase rotary machine and the like.

It is an object of the present disclosure to provide a control apparatus for a three-phase rotary machine capable of controlling a three-phase rotary machine to effectively exert performance depending on situations in consideration of a comparison between a phase current peak reducing effect and a conflicting event. It is another object of the present disclosure to provide an electric power steering apparatus having a control apparatus for a three-phase rotary machine.

According to an aspect of the present disclosure, a control apparatus for controlling an operation of a three-phase rotary machine having two sets of three-phase windings includes: two power converters that respectively correspond to the two sets of the windings, and output AC currents, having a same amplitude and a phase difference of $(30\pm60\times n)$ [deg] between AC currents, to the two sets of the windings according to operations of a plurality of switching elements, n being an integer; a harmonic component generator that generates at least one of a phase current fifth harmonic component having a frequency five times higher than a frequency of a phase current first harmonic component of a current command value flowing through the three-phase rotary machine and a phase current seventh harmonic component having a frequency seven times higher than the frequency of the phase current first harmonic component, as a harmonic component to be superimposed on the phase current first harmonic component; and two controllers that respectively calculates voltage command values for the two power converters according to the current command value obtained by superimposing the harmonic component on the phase current first harmonic component. A combination of an amplitude of the phase current fifth harmonic component and an amplitude of the phase current seventh harmonic component generated by the harmonic component generator to reduce a peak of the phase current first harmonic component is defined as a fundamental amplitude. The harmonic component generator performs a harmonic amplitude reduction process to reduce a phase current peak reduction amount, which is a peak reduction amount of the phase current first harmonic component, from the fundamental amplitude according to a predetermined parameter, and to reduce an absolute value of an amplitude of the harmonic component.

According to another aspect of the present disclosure, an electric power steering apparatus includes: a three-phase rotary machine that generates an assist torque for assisting a driver in a steering operation; the control apparatus for the three-phase rotary machine according to the first aspect and a transmission apparatus that transmits the assist torque output from the three-phase rotary machine to a steering shaft.

That is, in a case where the phase current peak is reduced preferentially, the harmonic component generator is capable of reducing heat generation in the switching elements and the winding sets by maintaining a harmonic component amplitude to be the fundamental amplitude particularly during zero rotation or low-speed rotation of the three-phase rotary machine. Meanwhile, in a case where a loss reducing effect achieved by superimposing the harmonic component is small or when avoiding a conflicting event is thought to be more crucial than reducing the phase current peak, the harmonic component generator reduces an absolute value of the harmonic amplitude.

Owing to the harmonic amplitude reduction process performed by the harmonic component generator according to a predetermined parameter in the manner as above, performance of the three-phase rotary machine can be exerted effectively depending on situations.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, several embodiments of a control apparatus for a three-phase rotary machine will be described according to the drawings. A configuration itself of the control apparatus is substantially same in all embodiments and each embodiment will be referred to as "the present embodiment". An ECU, which is "the control apparatus for a three-phase rotary machine" of the present embodiment, is applied to an electric power steering apparatus of a vehicle and controls energization of a motor (i.e., three-phase rotary machine) which generates a steering assist torque.

Configuration of Electric Power Steering Apparatus

Figure 1:
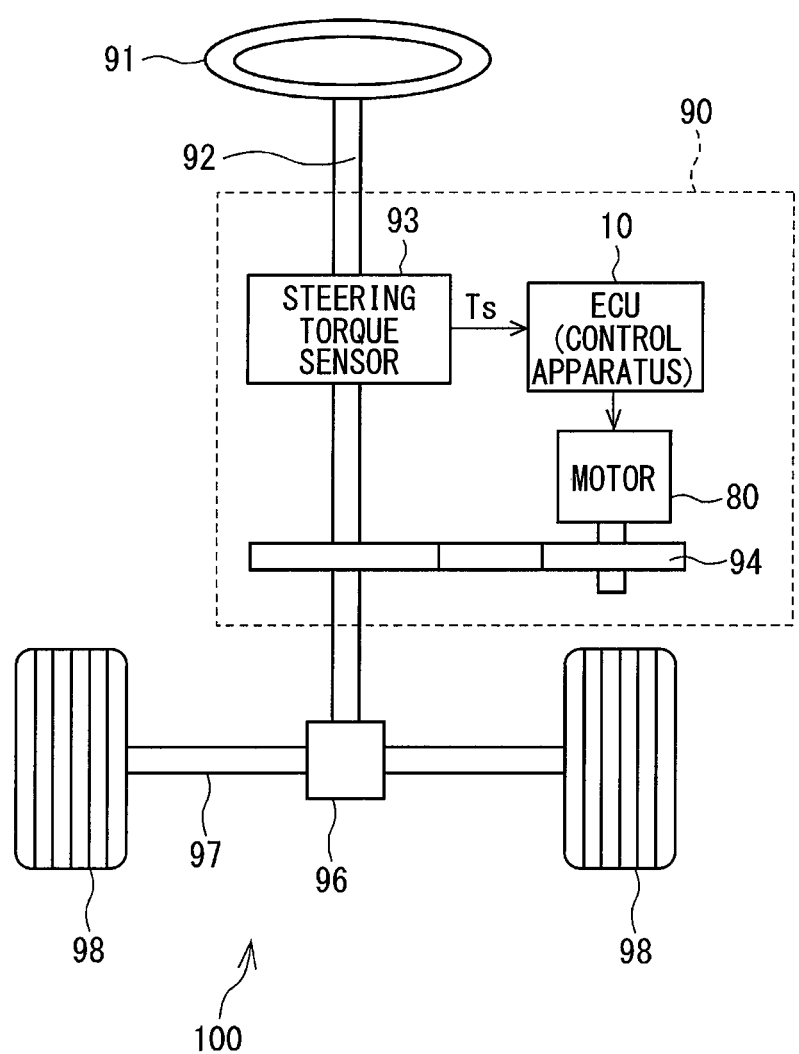
FIG. 1 is a schematic configuration view of an electric power steering apparatus to which a control apparatus for a three-phase rotary machine of each embodiment is applied.

FIG. 1 shows an overall configuration of a steering system 100 including an electric power steering apparatus 90. The electric power steering apparatus 90 shown in FIG. 1 is of a column assist type. It should be noted, however, that the present embodiment is also applicable to a rack assist electric power steering apparatus.

The steering system 100 includes a steering wheel 91, a steering shaft 92, a pinion gear 96, a rack shaft 97, wheels 98, the electric power steering apparatus 90, and so on.

The steering shaft 92 is connected to the steering wheel 91. The pinion gear 96 is provided at a tip end of the steering shaft 92 and meshes with the rack shaft 97. A pair of the wheels 98 are provided at both ends of the rack shaft 97 via tie rods or the like. When a driver turns the steering wheel 91, the steering shaft 92 connected to the steering wheel 91 rotates. Rotational motion of the steering shaft 92 is converted into linear motion of the rack shaft 97 by the pinion gear 96 and a pair of the wheels 98 are steered by an angle comparable to an amount of displacement of the rack shaft 97.

The electric power steering apparatus 90 includes a steering torque sensor 93, an ECU 10, a motor 80, a reduction gear 94 functioning as "a transmission apparatus", and so on.

The steering torque sensor 93 is provided at a midpoint of the steering shaft 92 and detects a steering torque Ts Induced by the driver. The ECU 10 controls driving of the motor 80 for the motor 80 to generate a desirable assist torque according to the steering torque Ts. The assist torque output from the motor 80 is transmitted to the steering shaft 92 via the reduction gear 94.

Configuration of Control Apparatus

A configuration of a control apparatus of the present embodiment will now be described with reference to FIG. 2 through FIG. 4.

Figure 2:
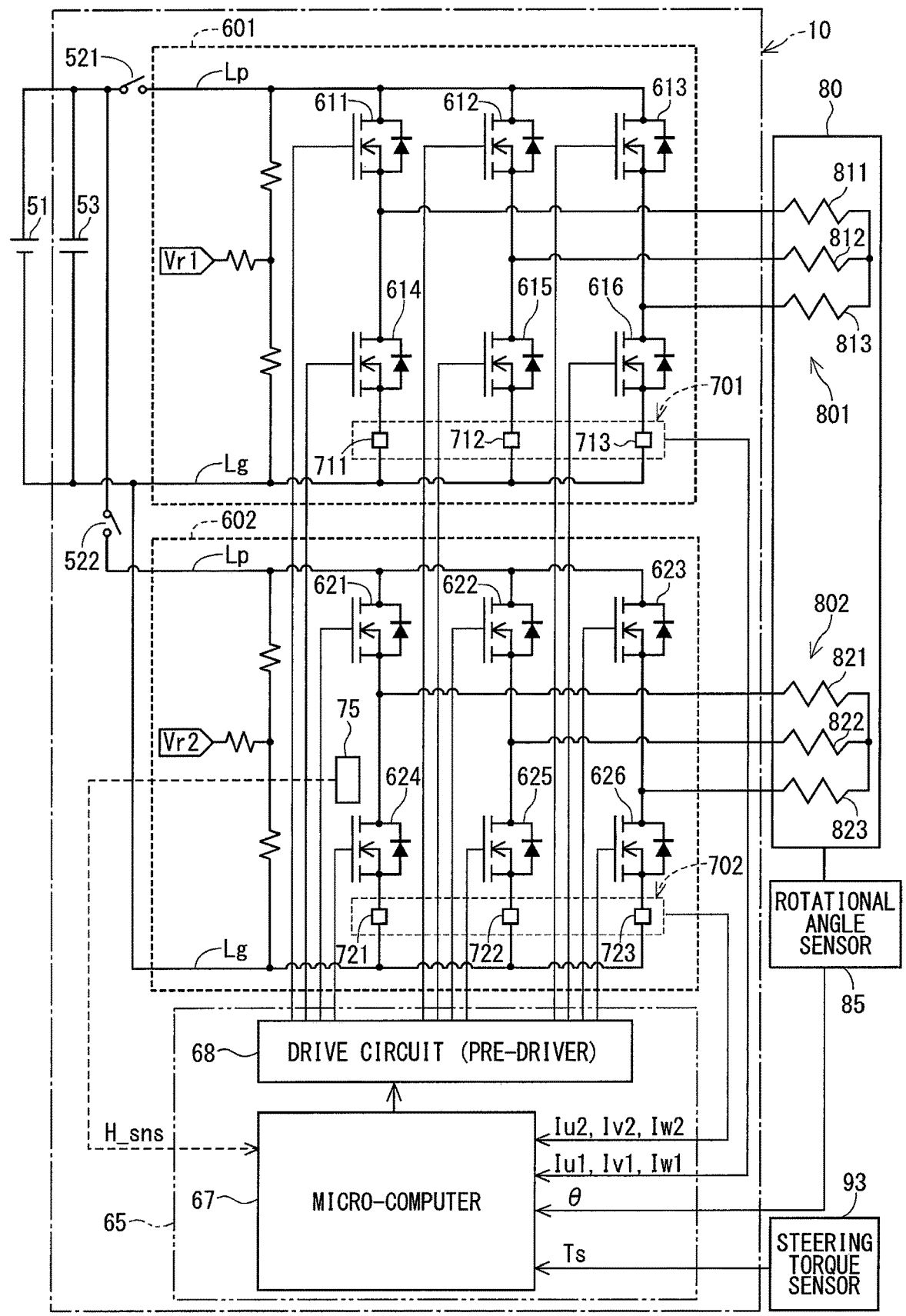
FIG. 2 is an overall configuration view of the control apparatus for a three-phase rotary machine.

FIG. 2 shows an overall configuration of the present embodiment. The motor 80, which is "the three-phase rotary machine", is a three-phase brushless motor having two three-phase winding sets 801 and 802. Coils 821, 822, and 823 of respective phases in the second winding set 802 are disposed 30 electrical degrees apart, respectively, from coils 811, 812, 813 of corresponding phases in the first winding set 801. Reference should be made to, for example, FIG. 3 of Japanese Patent No. 5672278 for a configuration of the winding sets 801 and 802.

A rotational angle sensor 85 detects an electrical angle θ of the motor 80, which is output to a control unit 65.

The ECU 10 as "the control apparatus" includes inverters 601 and 602, current sensors 701 and 702, the control unit 65, and so on.

The first inverter 601 functioning as "a first power converter" and the second inverter 602 functioning as "a second power converter" are provided to the two winding sets 801 and 802, respectively, and output AC currents having same amplitude and a phase difference of (30±60×n) degrees (n is an integer) with each other to the two winding sets 801 and 802, respectively.

Hereinafter, a unit including the winding sets and the inverters corresponding to the winding sets will be referred to as "systems". Numbers "1" and "2" at third digits of reference numerals and numbers "1" and "2" at ends of symbols representing physical amounts, such as a current and a voltage, indicate that components and physical amounts belong to first and second systems, respectively. A physical amount without a number "1" or "2" at the end indicates a physical amount of either system.

Six switching elements 611 through 616 and six switching elements 621 through 626 formed of, for example, MOSFETs are bridge-connected between a high-potential line Lp and a low potential line Lg in the inverters 601 and 602, respectively. The inverters 601 and 602 take switching actions in response to a drive signal from a drive circuit 68 in the control unit 65 to convert DC power of a battery 51 and supply the converted power to the two winding sets 801 and 802, respectively.

Power-supply relays 521 and 522 of the respective systems and a smoothing capacitor 53 are provided at inputs of the inverters 601 and 602. An input voltage can be detected by detecting divided voltages Vr1 and Vr2.

The current sensors 701 and 702 detect phase currents Iu1, Iv1, Iw1, Iu2, Iv2, and Iw2 of the respective systems by using current detection elements 711, 712, 713, 721, 722 and 723, respectively, and feed back the detected phase currents Iu1 through Iw2 to the control unit 65.

The control unit 65 is formed of a micro-computer 67, the drive circuit (or a pre-driver) 68, and so on and controls energization of the motor 80 according to the steering torque Ts detected by the steering torque sensor 93, feedback information of the phase currents Iu1, Iv1, Iw1, Iu2, Iv2, and Iw2 and the electrical angle θ, and so on.

Also, the ECU 10 is provided with a temperature sensor 75, such as a thermistor, to monitor heat generation caused when the switching elements 611 through 616 and 621 through 626 are energized and to determine whether current limit is necessary for protection against overheating. In the present embodiment, one temperature sensor 75 is provided for the inverters 601 and 602 mounted on a same circuit board and directly detects a temperature of a heat sink which receives heat radiated from the circuit board.

It is desirable to detect temperatures, in particular, maximum temperatures of the individual switching elements 611 through 616 and 621 through 626. However, providing a temperature sensor to every switching element is not practical in terms of space and cost and one temperature sensor 75 is used to detect a temperature of a common circuit board or heatsink in the present embodiment as a compromise.

Herein, a temperature detected by the temperature sensor 75 will be referred to as "an element detection temperature H_sns" on the basis of an original technical idea. "Element" in "element detection temperature" means the switching elements 611 through 616 and 621 through 626 which generate heat when energized by a power current. A first letter of "Temperature" and a first letter of "Torque" are "T". In order to avoid a duplicate use, "H" is used herein as a symbol representing a temperature.

In a circumstance where temperatures of the switching elements of the respective phases are averaged during medium-speed or high-speed rotation, the detection temperature H_sns is also thought to reflect an average temperature of multiple switching elements.

The element detection temperature H_sns detected by the temperature sensor 75 has an error from temperatures of the switching elements and it is necessary to find correct temperatures of the switching elements by estimation according to respective types of information. Hence, the ECU 10 of the present embodiment has an element temperature estimation portion described below in the control unit 65.

Given that a configuration of the element temperature estimation portion is a precondition, then it can be understood that the detection temperature H_sns detected by the temperature sensor 75 is merely "an inverter temperature" and temperatures of the switching elements are regulated only by an element estimation temperature H_est based on the inverter temperature.

A configuration of the control unit 65 will now be described with reference to FIG. 3 and FIG. 4. The control unit 65 feeds back actual currents flowing through the two three-phase winding sets 801 and 802 to current command values of the respective systems by vector control.

Figure 3:
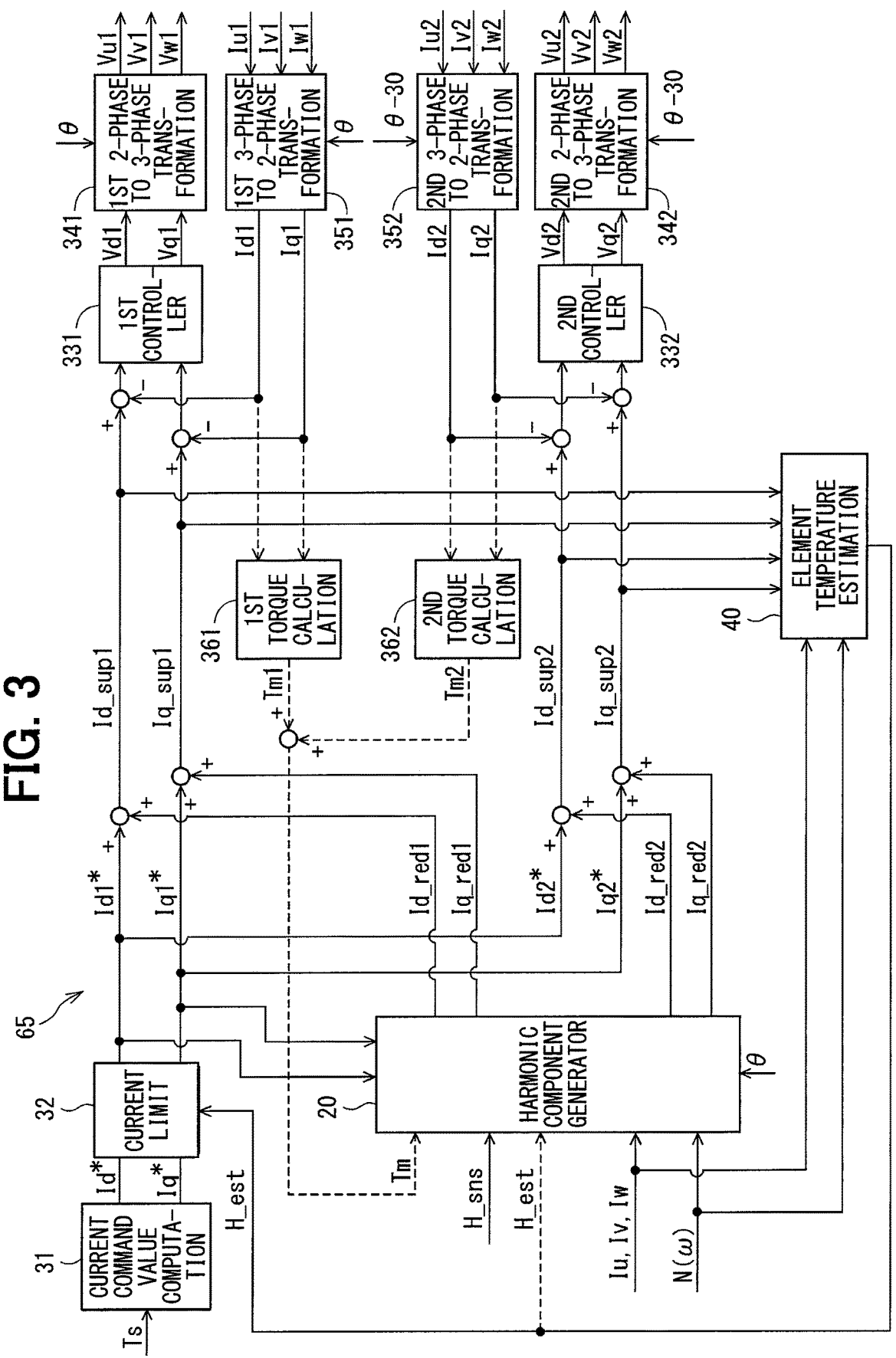
FIG. 3 is a control block diagram of a control unit.
Figure 4:
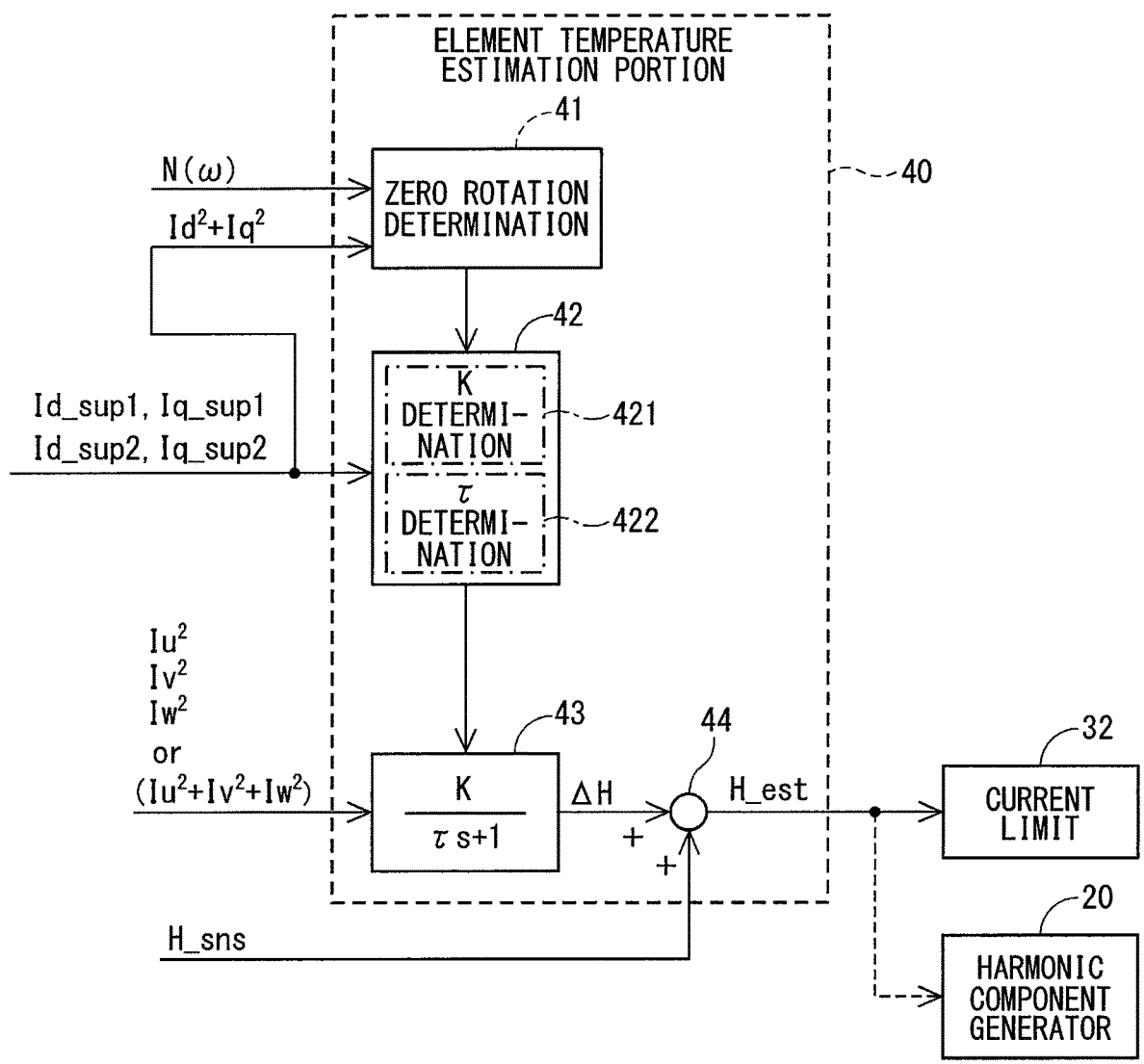
FIG. 4 is a control block diagram of an element temperature estimation portion.

In FIG. 3 and FIG. 4, "first" is added to a control block of the first system and "second" Is added to a control block of the second system in the control unit 65. However, because functions of the respective control blocks of the two systems are basically same, "first" and "second" may be omitted in the following description where appropriate.

The control unit 65 has a current command value computation portion 31, a current limit portion 32, controllers 331 and 332, two-phase to three-phase transformation portions 341 and 342, three-phase to two-phase transformation portions 351 and 352, and torque calculation portions 361 and 362 as a general configuration of the current feedback control and the vector control, and also has a harmonic component generation portion 20 and an element temperature estimation portion 40 as a unique configuration.

The current command value computation portion 31 calculates dq-axis current command values Id* and Iq* according to the steering torque Ts. When the element estimation temperature H_est calculated by the element temperature estimation portion 40 exceeds a predetermined value, the current limit portion 32 protects the switching elements 611 through 616 and 621 through 626 and the winding sets 801 and 802 against overheating by limiting the dq-axis current command values Id* and Iq*.

A configuration of the element temperature estimation portion 40 will now be described with reference to FIG. 4. The element temperature estimation portion 40 has a zero rotation determination part 41, a response constant determination part 42, a first-order delay computing element 43, and an adder 44.

As is shown in FIG. 3, a rotation speed N of the motor 80, phase currents Iu, Iv, and Iw, and dq-axis superimposition current command values Id_sup1, Iq_sup1, Id_sup2, and Iq_sup2 described below are input into the element temperature estimation portion 40. A value, such as a sum of squares, is calculated as needed according to the input current values.

The zero rotation determination part 41 determines that the motor 80 is in "a zero rotation state" when the motor 80 is energized and a rotation of the motor 80 is stopped, that is, when the rotation speed N of the motor 80 is substantially 0 and a sum of squares of the dq-axis currents is not substantially 0.

In the zero rotation state, a current is concentrated at a particular phase and the switching element of the particular phase may possibly generate heat excessively. Hence, particularly accurate temperature estimation is required. Meanwhile, heat generation of the respective phases is leveled while the motor 80 is rotating normally, and a need to prevent excessive heat generation is relatively low.

In the present embodiment, when the zero rotation determination part 41 determines the motor 80 as being in the zero rotation state, the response constant determination part 42 determines a response constant as described below as a general rule. The term, "response constant", referred to herein means a gain K and a time constant r in temperature rising characteristics of the switching elements. In other embodiments, the response constant determination part 42 may determine a response constant also when the motor 80 is in a state other than the zero rotation state.

The response constant determination part 42 includes a gain determination segment 421 and a time constant determination segment 422 and determines a response constant, which is the gain K and the time constant r, of the first-order delay computing element 43. Increasing the gain K and reducing the time constant r are both actions to raise the element estimation temperature H_est whereas reducing the gain K and increasing the time constant • are both actions to lower the element estimation temperature H_est.

The response constant determination part 42 of the present embodiment is characterized in that the response constant determination part 42 determines the response constant according to a phase current peak reduction amount obtained from the input dq-axis superimposition current command values Id_sup1, Iq_sup1, Id_sup2, and Iq_sup2.

A square value of a phase current for a phase subject to estimation (Iu2, Iv2, or Iw2) or a time average value of an integrated value of the square value (for example, ΣIu2/Δt) is input into the first-order delay computing element 43. The first-order delay computing element 43 computes a first-order delay response by a transfer function of "K/(τs+1)" with respect to the input square value of the phase current.

Consumed power W due to energization is given by: W=I2×R, where I is a current and R is resistance. Transfer amount and velocity of the consumed power W vary with thermal resistance and heat capacities of the switching elements and the heatsink. Accordingly, by computing a first-order delay response by reflecting thermal transfer amount and transfer velocity on the gain K and the time constant t, an amount of element temperature change after t seconds from a start of energization can be estimated transiently. In the manner as above, the first-order delay computing element 43 outputs a temperature change amount ΔH phase by phase for an input of a phase current square value or a time average value of an integrated value of the phase current square value.

The adder 44 adds the temperature change amount ΔH output from the first-order delay computing element 43 to the element estimation temperature H_sns detected by the temperature sensor 75 and outputs an addition result as the element estimation temperature H_est. The element estimation temperature H_sns is treated as an initial temperature in a transient temperature rise. In a case where an offset error of the output characteristics of the element temperature estimation part 40 is known in advance, the element estimation temperature H_est found by further adding an offset temperature may be output.

The element estimation temperature H_est calculated in the manner as above is notified to the current limit portion 32 as temperature information which accurately reflects temperatures of the switching elements and is used to determine whether the current limit is necessary.

As are indicated by broken lines in FIG. 3 and FIG. 4, the element estimation temperature H_est may be notified to the harmonic component generation portion 20 and used as a parameter in harmonic amplitude reduction processing described below.

Referring to FIG. 3 again, the dq-axis current command values Id* and Iq* computed by the current command value computation portion 31 and limited by the current limit portion 32 when necessary are divided to dq-axis current command values Id1* and Iq1* of the first system and dq-axis current command values Id2* and Iq2* of the second system, respectively. Because the first system inverter 601 and the second system inverter 602 have same electrical characteristics, a half of the current command value is designated to each system as a general rule. A current as a result of three-phase coordinate transformation applied to the dq-axis current command values corresponds to a phase current first harmonic component (or a fundamental wave component).

Peak reduction current command values Id_red1, Iq_red1, Id_red2, and Iq_red2 of a dq-axis sixth harmonic component computed by the harmonic component generation portion 20 are added, respectively, to the dq-axis current command values Id1*, Iq1*, Id2* and Iq2* of the respective systems.

The term, "peak reduction current command value", means a harmonic component generated by the harmonic component generation portion 20 to reduce a phase current peak value by being superimposed on the phase current first harmonic component. Heat generation and a loss can be reduced by reducing the phase current peak value. In particular, an effect of preventing a failure can be expected by reducing heat generation in the switching elements 611 through 616 and 621 through 626 of the inverters 601 and 602, respectively, and the windings sets 801 and 802 during zero rotation and low-speed rotation of the motor 80 when a current is concentrated at a particular phase.

The harmonic component generation portion 20 basically sets amplitude of a harmonic component with respect to amplitude of the phase current first harmonic component to reduce the phase current peak value to a lowest possible extent according to the dq-axis current command values Id* and Iq* and the electrical angle θ. However, in a case where a conflicting event of superimposition of a harmonic component exists, superimposition of a harmonic component is regulated or stopped in consideration of a comparison between the phase current peak reducing effect and the conflicting event. The phrase, "regulate superimposition of a harmonic component", means to reduce an absolute value of amplitude of a harmonic component. The phrase, "stop superimposition of a harmonic component" means to reduce amplitude of a harmonic component to 0.

As determination information, the harmonic component generation portion 20 obtains parameters, such as motor torque Tm, the element detection temperature H_sns or the element estimation temperature H_est, the phase currents Iu, Iv, and Iw, and the rotation speed N. The rotation speed N can be converted to the product of an electrical angular velocity ω, which is found by differentiating the electrical angle θ with respect to time, and a proportional constant. Hence, the electrical angular velocity ω may be obtained instead of the rotation speed N. A control by the harmonic component generation portion 20 according to the obtained parameters will be described below.

In the present embodiment, at least one of a phase current fifth harmonic component having a frequency five times a frequency of the phase current first harmonic component and a phase current seventh harmonic component having a frequency seven times the frequency of the phase current first harmonic component is superimposed as a harmonic component. Herein, "a phase current fifth harmonic component" and "a phase current seventh harmonic component" will be referred to, respectively, also as "a fifth harmonic" and "a seventh harmonic" where appropriate. Regarding concrete examples of the harmonic component described below, a configuration to superimpose a harmonic component formed by combining a phase current fifth harmonic component and a phase current seventh harmonic component is a first embodiment, and configurations to superimpose a phase current fifth harmonic component alone and a phase current seventh harmonic component alone are second and third embodiments, respectively.

In the present embodiment, the harmonic component generation portion 20 computes (6n−1)'-th and (6n+1)'-th harmonic components of a phase current from a dq-axis current (6n)'-th harmonic component of dq-axis coordinates. Typically, fifth and seventh harmonic components of a phase current are computed from a dq-axis current sixth harmonic component corresponding to a case where n=1. The dq-axis current sixth harmonic component has a frequency six times the frequency of the phase current first harmonic component.

A value found by adding the peak reduction current command value to the dq-axis current command value will be referred to as "a superimposition current command value". Dq-axis superimposition current command values Id_sup1, Iq_sup1, Id_sup2, and Iq_sup2 are defined, respectively, by Equations (1.1) through (1.4) as follows.

$$Id\_sup1 = Id1^* + Id\_red1 \quad (1.1)$$

$$Iq\_sup1 = Iq1^* + Iq\_red1 \quad (1.2)$$

$$Id\_sup2 = Id2^* + Id\_red2 \quad (1.3)$$

$$Iq\_sup2 = Iq2^* + Iq\_red2 \quad (1.4)$$

Deviations between the dq-axis superimposition current command values Id_sup1, Iq_sup1, Id_sup2, and Iq_sup2 and the actual currents Id1, Iq1, Id2, and Iq2 fed back from the three-phase to two-phase transformation parts 351 and 352 are input into the controllers 331 and 332. The controllers 331 and 332 compute voltage command values Vd1, Vq1, Vd2, and Vq2 by a proportional-integral control computation for the respective current deviations to converge to 0. The voltage command values Vd1, Vq1, Vd2, and Vq2 are converted into, for example, PWM signals, which are output to the inverters 601 and 602.

In the manner as above, the controllers 331 and 332 compute the voltage command values Vd1, Vq1, Vd2, and Vq2 for the inverters 601 and 602 according to the superimposition current command values Id_sup1, Iq_sup1, Id_sup2, and Iq_sup2 obtained by superimposing a harmonic component on the phase current first harmonic component.

The two-phase to three-phase transformation portions 341 and 342 transform the dq-axis voltage command values Vd1, Vq1, Vd2, and Vq2 to three-phase voltage command values Vu1, Vv1, Vw1, Vu2, and Vv2, and Vw2 by coordinate transformation.

The three-phase to two-phase transformation portions 351 and 352 transform the actual currents Iu1, Iv1, Iw1, Iu2, Iv2, and Iw2 detected, respectively, by the current detection elements 711, 712, 713, 721, 722, and 723 to the dq-axis currents Id1, Iq1, Id2, and Iq2 by coordinate transformation, and feedback the dq-axis currents Id1, Iq1, Id2, and Iq2.

In the coordinate transformation computations above, a computation is made by using "θ" as an electrical angle in the first system and by using "θ−30" with a 30 degrees phase difference as an electrical angle in the second system.

The torque calculation portions 361 and 362 calculate motor torque Tm1 and Tm2 of the respective systems according to the dq-axis currents Id1, Iq1, Id2, and Iq2 and a circuit constant of the motor 80 in accordance with Equations (2.1) and (2.2) as below. A same circuit constant is used in the two systems.

$$Tm1 = pm \times \{Iq1 \times \phi + (Ld - Lq) \times Id1 \times Iq1\} \quad (2.1)$$

$$Tm2 = pm \times \{Iq2 \times \phi + (Ld - Lq) \times Id2 \times Iq2\} \quad (2.2)$$

where pm is the number of pole pairs in an electric motor, φ is an armature interlinkage flux of permanent magnets, Ld is d-axis inductance, and Lq is q-axis inductance.

A total torque Tm found by adding the motor torques Tm1 and Tm2 of the two systems is obtained by the harmonic component generation portion 20. In FIG. 3 and FIG. 4, signal inputs and outputs relating to the motor torques Tm1, Tm2, and Tm are indicated by broken lines.

In other embodiments, an output torque of the motor 80 may be directly detected by a torque sensor and notified to the harmonic component generation portion 20.

The following will describe a torque ripple of the motor 80 in which the two three-phase winding sets 801 and 802 are energized with a phase current obtained by superimposing a harmonic component on the phase current first harmonic component by the configuration described above.

Firstly, the motor torque Tm in a configuration of one system is expressed by Equation (3.1) as below by using fundamental currents of three phases, Iu, Iv, and Iw, and fluxes of three phases, φu, φv, and φw.

(Mathematical Formula 1)

$$T_m = I_u \phi_u + I_v \phi_v + I_w \phi_w \quad (3.1)$$

The motor torque Tm in a case where the fifth and seventh harmonic components are included in one system is expressed by Equation (3.2) as below for zeroth, sixth, and twelfth terms of the electrical angle θ. In Equation (3.2) below, $I_1$, $I_5$, and $I_7$ are first, fifth, and seventh harmonic current amplitudes, respectively, and φ1, φ5, and φ7 are first, fifth, and seventh harmonic flux amplitudes, respectively.

For example, Japanese Patent No. 5672278 describes an equation including terms of up to sixth order and omits terms of twelfth and higher order. It should be noted, however, that the present description is characterized by including terms of up to twelfth order.

(Mathematical Formula 2)

$$\begin{aligned} T_m = \quad & \quad (3.2) \\ 1.5 \times \{ & I_1\phi_1 - I_1\phi_5 \cos(6\theta) + I_1\phi_7 \cos(6\theta) - I_5\phi_1 \cos(6\theta) + I_5\phi_5 - \\ & I_5\phi_7 \cos(12\theta) + I_7\phi_1 \cos(6\theta) - I_7\phi_5 \cos(12\theta) + I_7\phi_7 \} \end{aligned}$$

In the configuration of the present embodiment in which the two winding sets 801 and 802 have a positional relationship of 30 electrical degrees apart, amplitudes of AC currents output from the inverters 601 and 602 of the two systems are equal to each other and have a phase difference of 30 degrees from each other. Hence, the total torque Tm, which is a sum of the motor torque Tm1 of the first system and the motor torque Tm2 of the second system, is expressed by Equation (3.3) as follows.

(Mathematical Formula 3)

$$\begin{aligned} T_m = \; & T_m1 + T_m2 \quad (3.3) \\ = \; & 1.5 \times \{ I_1\phi_1 - I_1\phi_5 \cos(6\theta) + I_1\phi_7 \cos(6\theta) - \\ & I_5\phi_1 \cos(6\theta) + I_5\phi_5 - I_5\phi_7 \cos(12\theta) + I_7\phi_1 \cos(6\theta) - \\ & I_7\phi_5 \cos(12\theta) + I_7\phi_7 \} + 1.5 \times \{ I_1\phi_1 + I_1\phi_5 \cos(6\theta) - \\ & I_1\phi_7 \cos(6\theta) + I_5\phi_1 \cos(6\theta) + I_5\phi_5 - I_5\phi_7 \cos(12\theta) - \\ & I_7\phi_1 \cos(6\theta) - I_7\phi_5 \cos(12\theta) + I_7\phi_7 \} \\ = \; & 3 \times \{ I_1\phi_1 + I_5\phi_5 + I_7\phi_7 - I_5\phi_7 \cos(12\theta) - \\ & I_7\phi_5 \cos(12\theta) \} \end{aligned}$$

In Equation (3.3) above, signs of all the sixth terms included in Tm1 and all the sixth terms included in Tm2 are opposite. Hence, a total is found to be 0. That is, sixth-order torque ripples can be cancelled each other out in the total torque Tm of the two systems.

Meanwhile, signs of all the twelfth terms included in Tm1 and all the twelfth terms induced in Tm2 are same and remain in a last line in Equation (3.3). That is, a term of "$I_5 \phi_7 \cos(12\theta)$" of the phase current fifth harmonic component and a term of "$I_7 \phi_5 \cos(12\theta)$" of the phase current seventh harmonic component cause an increase of a torque ripple.

As has been described, superimposing the fifth and seventh harmonic components on the phase current first harmonic component raises a problem that a torque ripple is increased as one of conflicting events of a capability of reducing the phase current peak value. In the electric power steering apparatus 90, an increase of a torque ripple causes noises and vibrations of the steering wheel 91 for the driver and has an influence on a steering feeling and a product quality. In addition, a computation load applied on the control unit 65 increases when a computation to superimpose a harmonic component is performed.

That is to say, superimposition of a harmonic component has a tradeoff relationship between a problem relating to a reduction of heat generation and a loss by reducing the phase current peak and a problem relating to a reduction of a torque ripple and a reduction of a computation loss and the like. Hence, the control apparatus is required to perform appropriate processing by discriminating a case where the phase current peak is reduced preferentially from other cases depending on an operating state of the three-phase rotary machine.

Such being the case, the harmonic component generation portion 20 of the present embodiment is characterized in that the harmonic component generation portion 20 performs "harmonic amplitude reduction processing" to reduce a phase current peak reduction amount and to reduce an absolute value of amplitude of a harmonic component according to a predetermined parameter.

The harmonic amplitude reduction processing will now be described in detail in first through third embodiments each having a different configuration of a harmonic component to be superimposed on the phase current first harmonic component.

First Embodiment

In a first embodiment, the control unit 65 of the ECU 10 superimposes a harmonic component formed by combining a phase current fifth harmonic component and a phase current seventh harmonic component on a phase current first harmonic component. A reduction of a phase current peak by energization with the fifth harmonic and the seventh harmonic will be described with reference to FIG. 5 through FIG. 8.

Figure 5:
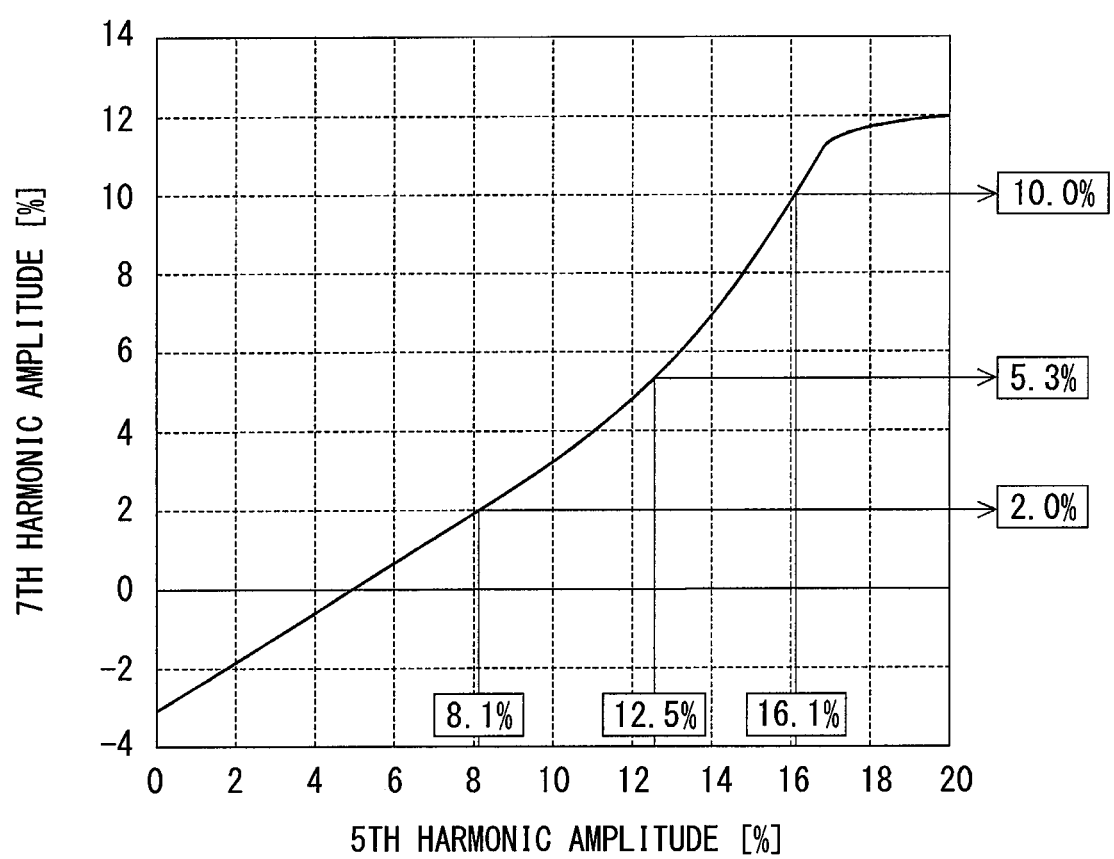
FIG. 5 is a characteristic chart showing an optimal amplitude line, on which a phase current peak reduction amount becomes largest when a fifth and seventh complex harmonic is superimposed according to a first embodiment.
Figure 6:
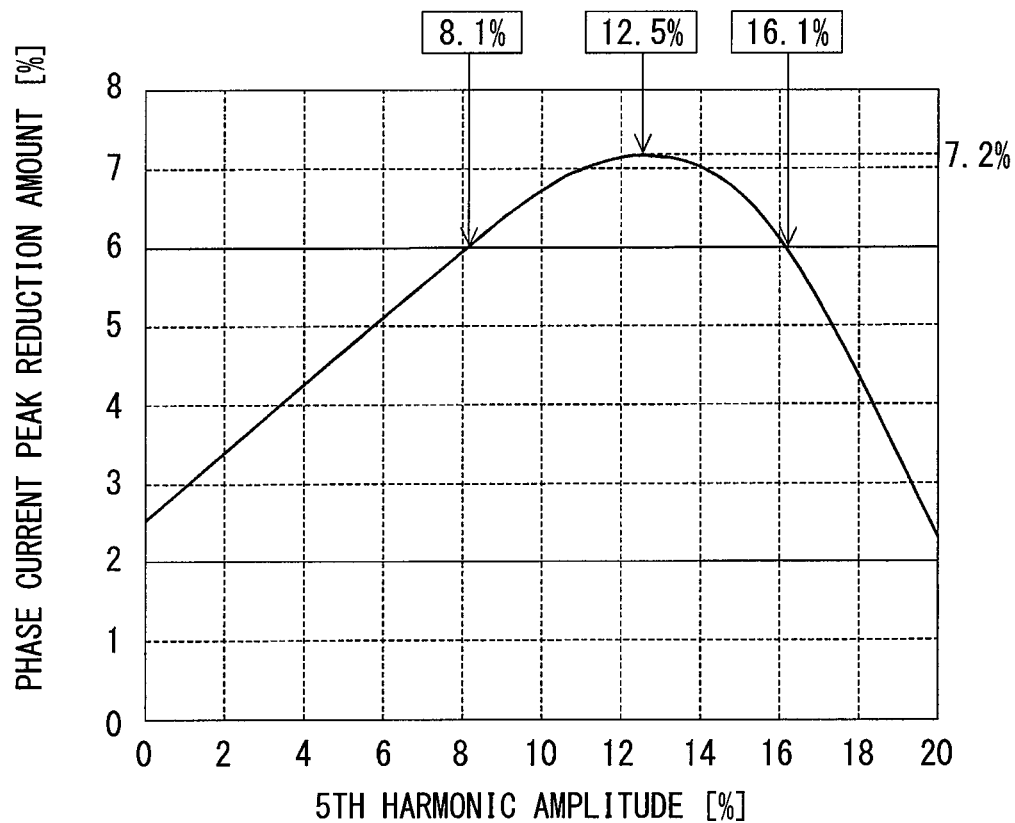
FIG. 6 is a characteristic chart showing a relationship between fifth harmonic amplitude and a phase current peak reduction amount on the optimal amplitude line.

Firstly, FIG. 5 and FIG. 6 show an analysis result of an amplitude ratio of the fifth and seventh harmonics with respect to amplitude of the phase current first harmonic component treated as 100% to reduce the phase current peak to a lowest possible extent when the fifth and seventh harmonics are superimposed on the phase current first harmonic component.

Given that a peak of a phase current superimposed with the fifth and seventh harmonics is, for example, 95% of the peak of the phase current first harmonic component, then it is said "a phase current peak reduction amount is 5%".

A characteristic line of FIG. 5 represents an optimal combination of the seventh harmonic amplitude with each fifth harmonic amplitude, with which the phase current peak reduction amount becomes largest. The characteristic line will be referred to as "an optimal amplitude line".

A characteristic line of FIG. 6 represents a relationship between the fifth harmonic amplitude and the phase current peak reduction amount on the optimal amplitude line.

Let x ($8.1 \le x \le 16.1$) [%] be the fifth harmonic amplitude and y ($2.0 \le x \le 10.0$) [%] be the seventh harmonic amplitude. Then, the optimal amplitude line is approximated by a line given by, for example, Equations (4.1) and (4.2) as follows.

$$y = 0.75x - 4.1 (8.1 \le x \le 12.5) \quad (4.1)$$

$$y = 1.31x - 11.1 (12.5 \le x \le 16.1) \quad (4.2)$$

Equations (4.1) and (4.2) above express a slope by a value rounded to a nearest hundredth to have two digits after a decimal point and express an intercept by a value rounded to a nearest tenth to have one digit after the decimal point. However, the number of rounded digits can be changed as needed. Hence, any mathematical formula which changes only the number of rounded digits under a same technical idea is deemed as being substantially same as the mathematical formulae disclosed herein. The same applies to mathematical formulae below.

When the fifth harmonic amplitude is 12.5% and the seventh harmonic amplitude is 5.3% on the optimal amplitude line, the phase current peak reduction amount is found to be as large as 7.2%. A combination of the amplitudes specified above will be referred to as "largest reduction amount amplitude", which is treated as "fundamental amplitude" in the harmonic amplitude reduction processing.

As is shown in FIG. 6, the fifth harmonic amplitude with a phase current peak reduction amount exceeding 6% ranges from 8.1 to 16.1%. As is shown in FIG. 5, the seventh harmonic amplitude corresponding to the fifth harmonic amplitude within the range specified as above ranges from 2.0 to 10.0%.

Figure 13A:
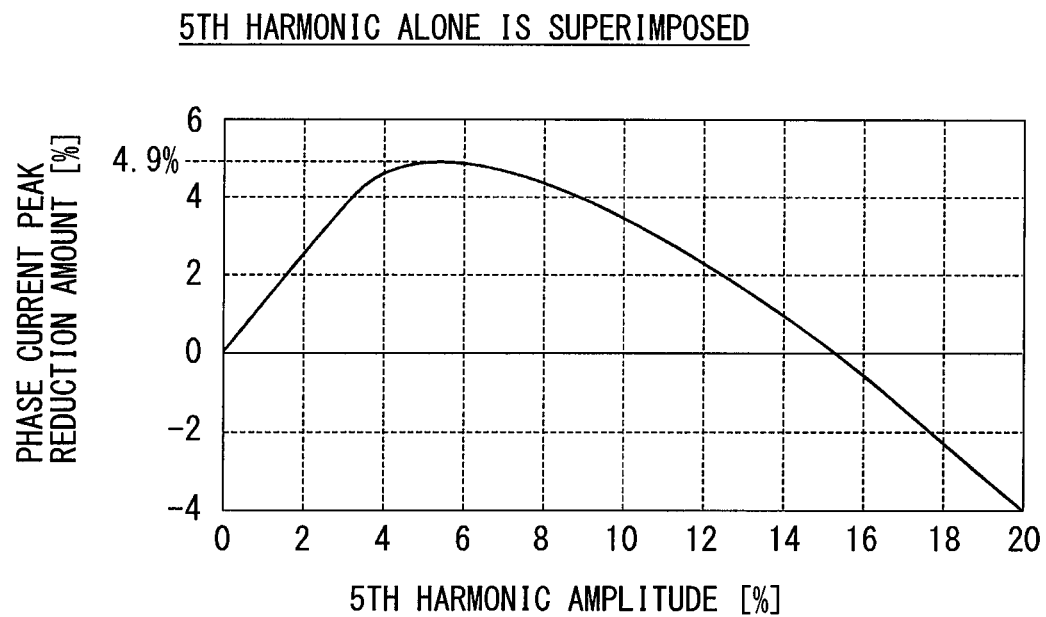
FIG. 13A and FIG. 13B are characteristic charts indicating a relationship between harmonic amplitude and a phase current peak reduction amount, FIG. 13A indicating the relationship when a fifth harmonic alone is superimposed according to a second embodiment and FIG. 13B indicating the relationship when a seventh harmonic alone is superimposed according to a third embodiment.

As is shown in FIG. 13A, the largest phase current peak reduction amount is 4.9% when the fifth harmonic component alone is superimposed on the phase current first harmonic component. Meanwhile, a peak reduction amount of 6% is comparable to 4.9% plus about 1%. That is, by superimposing a fifth and seventh complex harmonic component on the phase current first harmonic component with the fifth harmonic amplitude ranging from 8.1 to 16.1% and the seventh harmonic amplitude ranging from 2.0 to 10.0% on the optimal amplitude line, the phase current peak reduction amount can be increased by 1% or more in comparison with a case where the fifth harmonic alone is superimposed.

Figure 7:
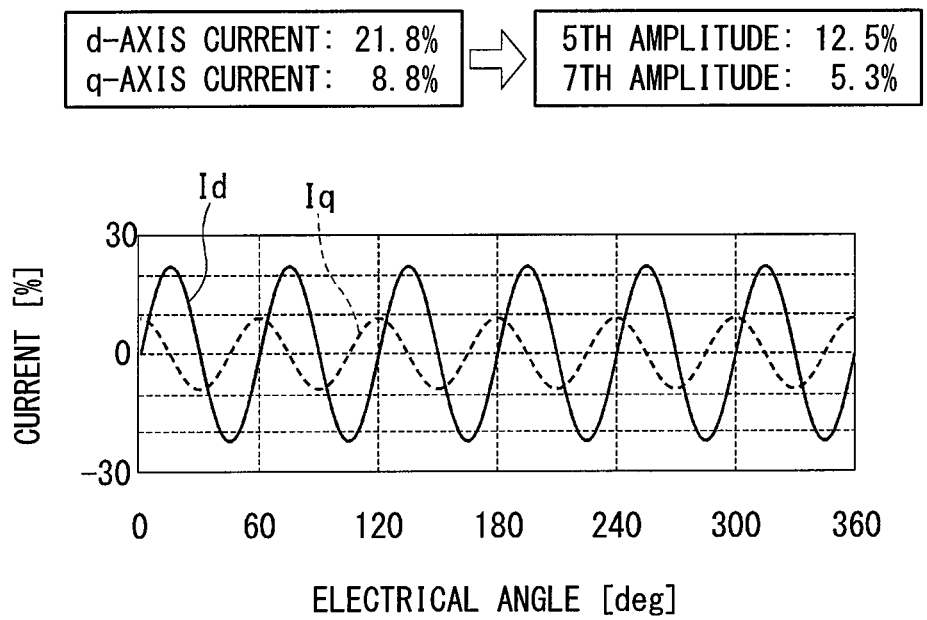
FIG. 7 is a waveform chart of a dq-axis current sixth harmonic component from which fifth and seventh harmonic components of largest reduction amount amplitude are generated.

In the present embodiment, the phase current fifth and seventh harmonic components are generated by applying coordinate transformation to the peak reduction current command value formed of a d-axis current of a sixth-order sine wave and a q-axis current of the sixth-order sine wave. FIG. 7 shows a waveform of the d-axis current of the sixth-order sine wave and a waveform of the q-axis current of the sixth-order sine wave, from which the largest reduction amount amplitude is generated. When amplitude of the d-axis current of the sixth-order sine wave is set to 21.8% and amplitude of the q-axis current of the sixth-order sine wave to 8.8%, amplitude of the fifth harmonic component is found to be 12.5% by a coordinate transform computation equation (5.1) as below and amplitude of the seventh harmonic component is found to be 5.3% by a coordinate transform computation equation (5.2) as follows.

$$(21.8+8.8)/2 \times \sqrt{(2/3)} = 12.5 \quad (5.1)$$

$$(21.8-8.8)/2 \times \sqrt{(2/3)} = 5.3 \quad (5.2)$$

Figure 8:
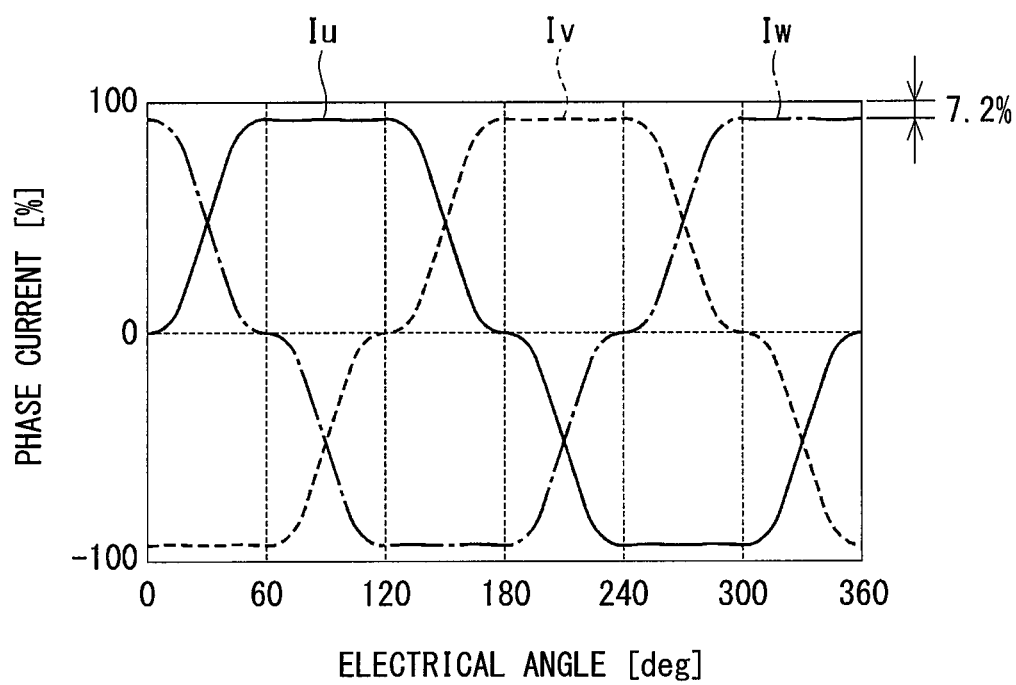
FIG. 8 is a phase current waveform chart when fifth and seventh harmonic components of the largest reduction amount amplitude are superimposed.

FIG. 8 shows a phase current waveform with the peak reduction amount of 7.2% when the fifth and seventh complex harmonic component of the fundamental amplitude is superimposed. The phase current peak value has a large influence on heat generation during zero rotation and low-speed rotation of the motor 80. Hence, a loss is calculated according to a square value of the peak current in accordance with Equation (6) as below. Then, a loss reducing effect when the peak reduction amount is 7.2% Is found to be 13.9%.

$$\{1-(1-0.072)^2\} \times 100 = 13.9 \quad (6)$$

Hence, by reducing the phase current peak value by superimposing the fifth and seventh complex harmonic component of the largest reduction amount amplitude during zero rotation and low-speed rotation of the motor 80, a loss in one electrical angular cycle can be reduced by 13.9% in comparison with sine wave driving by the phase current first harmonic component alone. In addition, heat generation in the switching elements 611 through 616 and 621 through 626 and the winding sets 801 and 802 caused by current concentration in a particular phase can be reduced.

As described above, superimposing the fifth and seventh harmonic components on the phase current first harmonic component raises a problem that a torque ripple is increased as one of conflicting events of a capability of reducing the phase current peak value. Such an increase of a torque ripple becomes larger as amplitudes of the fifth and seventh harmonic components become larger. Hence, for example, in a case where the loss reducing effect achieved by superimposing a harmonic component is small as during medium-speed and low-speed rotation of the motor 80 or in a case where avoiding a conflicting event is more crucial than reducing the phase current peak, it is thought to be rather preferable to regulate or stop superimposition of a harmonic component.

Hence, the harmonic component generation portion 20 reduces the phase current peak reduction amount and reduces amplitude of a harmonic component by performing "the harmonic amplitude reduction processing" according to a predetermined parameter. Herein, amplitude of the fifth harmonic component is defined by a positive value and amplitude of the seventh harmonic component superimposed with a 180 degrees phase difference from the fifth harmonic component is defined by a negative value. Accordingly, "reduce amplitude" means to reduce an absolute value of the amplitude, that is, to change amplitude in a direction approaching to 0 not only in the case of the fifth harmonic but also in the case of the seventh harmonic.

The following will describe a conflicting event of the phase current peak reducing effect achieved by superimposing a harmonic component on the phase current first harmonic component, mainly, an increase of a torque ripple.

In such a case, the harmonic component generation portion 20 performs the harmonic amplitude reduction processing according to "a parameter relating to tradeoffs between a peak reduction of the phase current first harmonic component and a reduction of a torque ripple generated at the motor 80 when the harmonic component is superimposed".

For example, a reduction of a torque ripple which has an influence on a steering feeling of a driver and a product quality is particularly crucial in a control apparatus driving a steering assist motor in an electric power steering apparatus. It is therefore preferable to perform the harmonic amplitude reduction processing according to a parameter used to appropriately determine which of the peak of the phase current first harmonic component and a torque ripple is reduced preferentially.

Parameters can be an element temperature H of the switching elements 611 through 616 and 621 through 626, a current I passed through the motor 80, a motor torque Tm, a rotation speed N, and so on.

The harmonic amplitude reduction processing performed by the harmonic component generation portion 20 will now be described with reference to FIG. 9 through FIG. 11. A symbol "S" used in a description of a flowchart of FIG. 9 stands for step.

Figure 9:
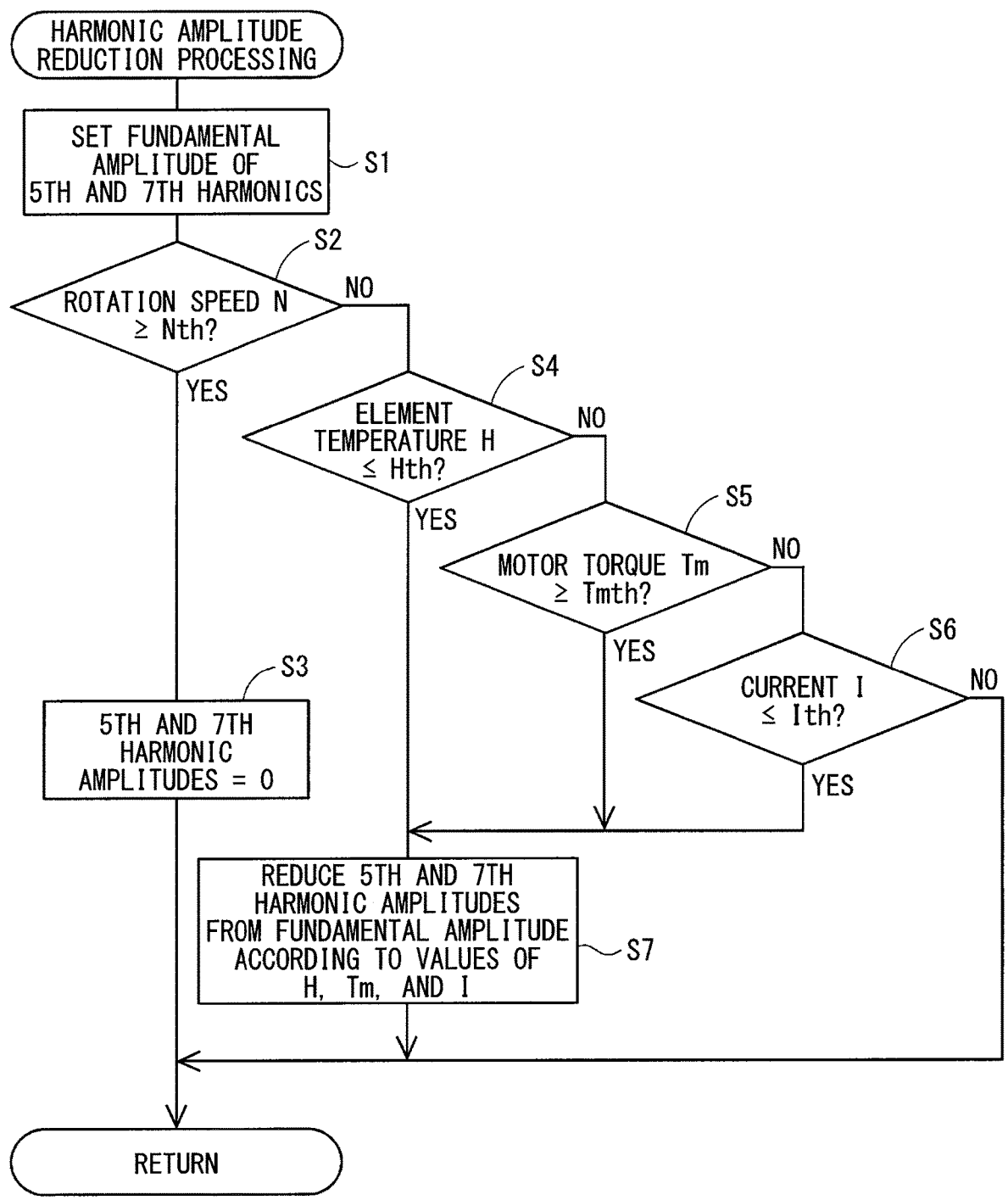
FIG. 9 is a flowchart of fifth and seventh harmonic amplitude set processing.
Figure 10A:
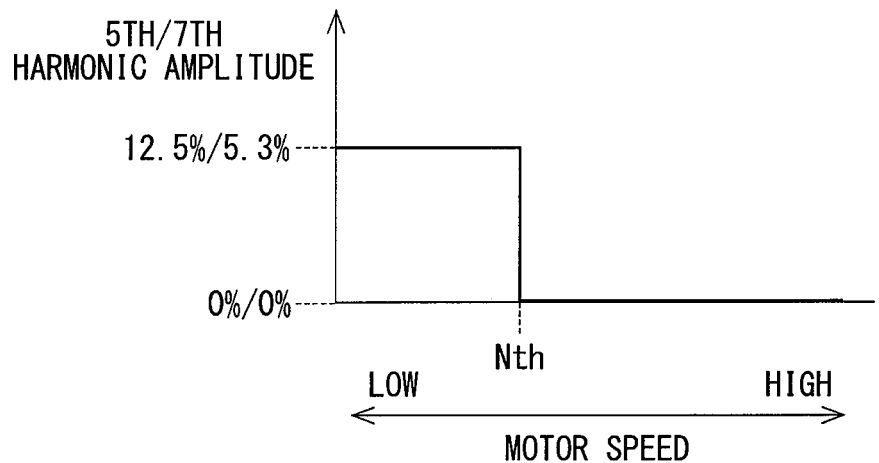
FIGS. 10A, 10B, and 10C are characteristic charts used to describe harmonic amplitude reduction processing, FIG. 10A showing the processing when a rotation speed is used as a parameter, FIG. 10B showing the processing when an element temperature or a current is used as a parameter, and FIG. 10C showing the processing when a motor torque is used as a parameter.

In FIG. 9, a fundamental amplitude of the fifth and seventh harmonics is set in S1. As a general rule, the fundamental amplitude is set to a largest reduction amount amplitude with fifth harmonic amplitude of 12.5% and seventh harmonic amplitude of 5.3% to secure a largest phase current peak reduction amount. However, in consideration of a margin to prevent the fundamental amplitude from shifting to a larger amplitude side from the largest reduction amount amplitude due to a control error or the like, the fundamental amplitude may be set to more on a smaller amplitude side than the largest reduction amount amplitude (for example, the fifth harmonic amplitude of 12.0% and the seventh harmonic amplitude of 5.0%).

The harmonic component generation portion 20 compares the rotation speed N with a rotation speed threshold Nth in S2. In a case where the rotation speed N is at or above the rotation speed threshold Nth, that is, YES in S2, advancement is made to S3.

In S3, superimposition of a harmonic component on the phase current first harmonic component is stopped by reducing both of the fifth harmonic amplitude and the seventh harmonic amplitude to 0%. That is, when the rotation speed N is used as the parameter, amplitude of the harmonic component is either the fundamental amplitude or 0%. Such processing is shown in FIG. 10A.

The phase current peak value has a large influence on heat generation in the switching elements during zero rotation and low-speed rotation of the motor 80. Hence, it is effective to reduce the phase current peak value by superimposing a harmonic component on the phase current first harmonic component. Meanwhile, an actual value has a larger influence on heat generation than the peak value during medium-speed rotation or high-speed rotation of the motor 80. When a loss is evaluated according to a square value of a current effective value, a loss is not reduced by superimposing a harmonic component in comparison with sine wave driving by the phase current first harmonic component alone.

Hence, the phase current peak value is reduced by superimposing a harmonic component during zero rotation or low-speed rotation of the motor 80 whereas a harmonic component is not superimposed during medium-speed rotation or high-speed rotation.

In a case where a determination made in S2 is NO, that is, during zero rotation or low-speed rotation with the rotation speed N below the threshold Nth, the harmonic component generation portion 20 compares values of the respective parameters with corresponding thresholds in S4 through S6 in order of the element temperature H, the motor torque Tm, and the current I and determines whether to reduce the harmonic amplitude. The element temperature H can be either an element detection temperature H_sns or an element estimation temperature H_est.

In a case where the element temperature H is at or below the temperature threshold Hth, a determination made in S4 is YES.

In a case where the motor torque Tm is at or above a torque threshold Tmth, a determination made in S5 is YES.

In a case where the current I is at or below a current threshold Ith, a determination made in S6 is YES.

In a case where a determination made in any of S4 through S6 is YES, advancement is made to S7.

In S7, the fifth harmonic amplitude and the seventh harmonic amplitude are reduced from the fundamental amplitude according to values of the element temperature H, the motor torque Tm, and the current I.

Figure 10B:
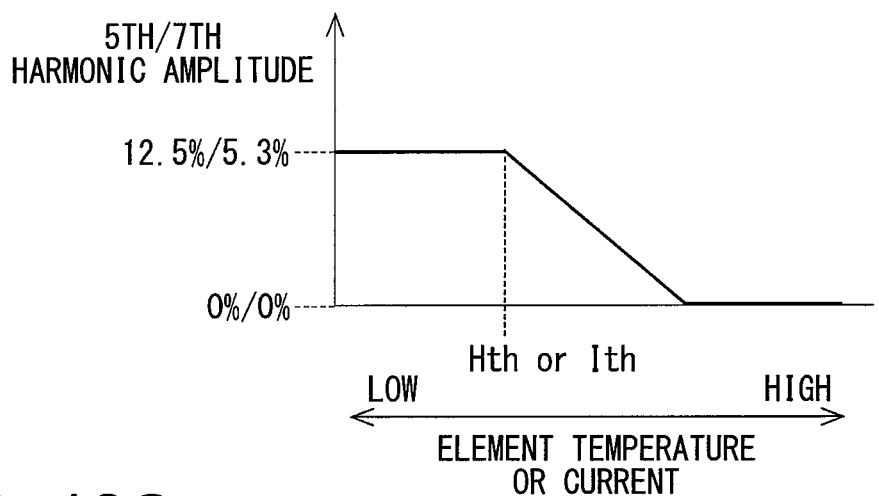
Figure 11:
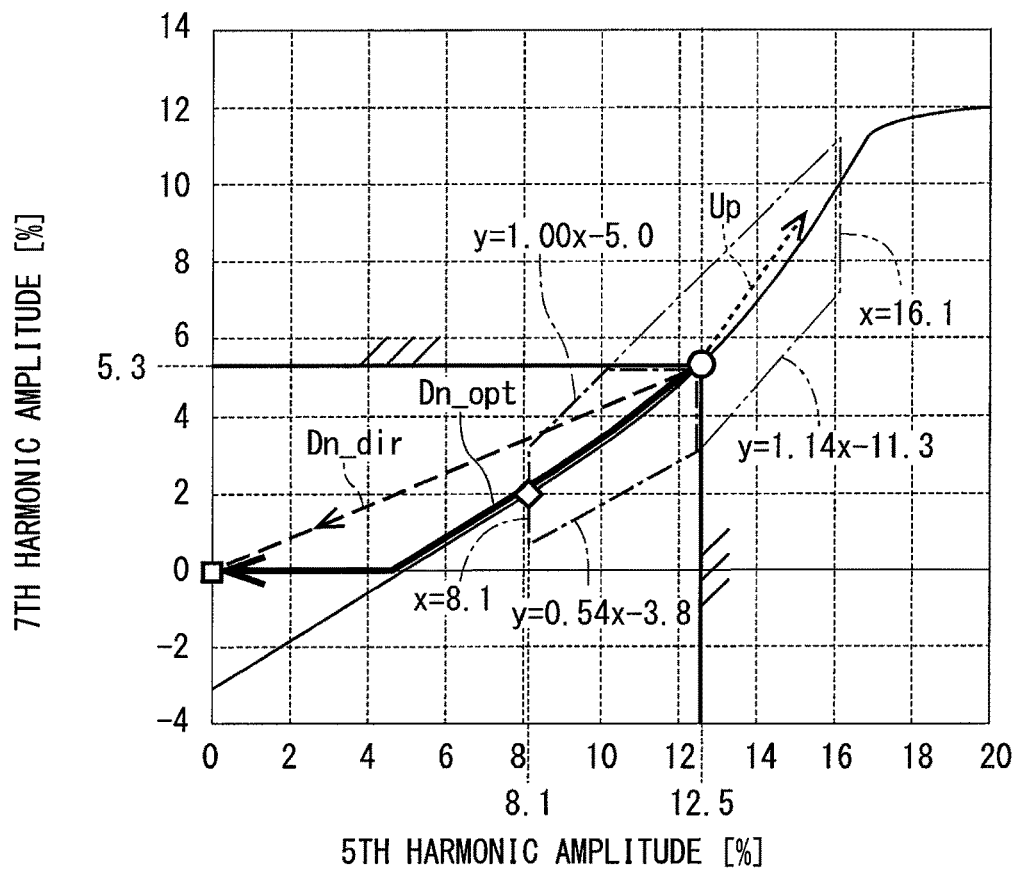
FIG. 11 is a characteristic chart showing the harmonic amplitude reduction processing of a fifth and seventh complex harmonic component.

As is shown in FIG. 10B, the element temperature H and the current I show similar characteristics, and an absolute value of amplitude of a harmonic component is reduced more as the element temperature H becomes lower than the temperature threshold Hth or the current I becomes lower than the current threshold Ith. A need to reduce heat generation in enhancing thermal performance is reduced more as the element temperature H or the current I becomes lower. Hence, a torque ripple can be reduced by reducing amplitude of a harmonic component more while reducing heat generation less.

The current I and the element temperature H are basically thought to have a positive correlation. However, no thermal problem occurs even when the current I is high as long as heat radiation performance of the inverters 601 and 602 is high. Hence, a determination of the current I in the flowchart is performed later in the flowchart.

Figure 10C:
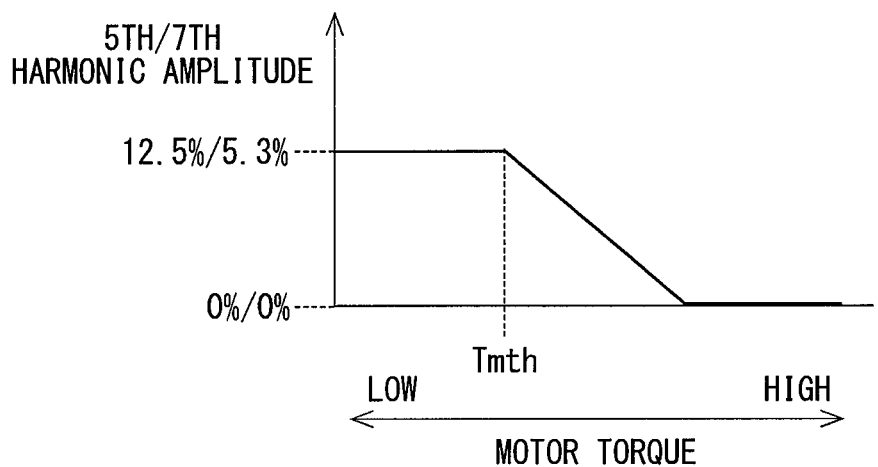

As is shown in FIG. 10C, the harmonic amplitude is gradually approximated to 0% from the fundamental amplitude as the motor torque Tm becomes higher than the torque threshold Tmth. When the motor torque Tm is relatively high, a torque ripple has a larger influence on a steering feeling of the driver. It is therefore preferable to reduce a torque ripple preferentially by reducing amplitude of a harmonic component.

As has been described, in examples of FIG. 10B and FIG. 10C, the harmonic amplitude is changed continuously from the fundamental amplitude to 0% according to parameters, that is, the element temperature H or the current I and the motor torque Tm. Variable characteristics in such a case are not limited to linear characteristics as are shown in FIG. 10B and FIG. 10C and may be curved characteristics or multi-level characteristics instead. Alternatively, as with the rotation speed N of FIG. 10A, the variable characteristics may be two-value characteristics.

Conversely, continuous or multi-level variable characteristics may be adopted instead of two-value characteristics in the harmonic amplitude reduction processing according to the rotation speed N in S3.

Meanwhile, in a case where determinations made in all of S4 through S6 are NO, the element temperature H and the current I are relatively high while the motor torque Tm is relatively low. Hence, a need to reduce heat generation in the inverters 601 and 602 is high whereas a torque triple causes a problem relatively less frequently. In such a case, it is preferable to reduce heat generation and a loss preferentially by reducing the phase current peak value. Accordingly, the harmonic component of the fundamental amplitude set in S1 is superimposed on the phase current first harmonic component by ending a routine directly.

A control configuration preferable to gradually approximate the harmonic amplitude from the fundamental amplitude to 0% will now be described with reference to FIG. 11. In FIG. 11, a circular mark represents the fundamental amplitude with the fifth harmonic amplitude of 12.5% and the seventh harmonic amplitude of 5.3%. A point of the circular mark means a starting point of the harmonic amplitude reduction processing.

The harmonic amplitude reduction processing is to gradually approximate an absolute value of the harmonic amplitude to 0% by reducing the absolute value with an aim of reducing a torque ripple. Hence, processing to increase the harmonic amplitude from the fundamental amplitude as is indicated by a dotted arrow Up is naturally omitted. In a case where the rotation speed N is at or above the rotation speed threshold Nth and the phase current peak does not need to be reduced at all, that is, in the case of S3 of FIG. 9 or the like, the harmonic amplitude may be directly moved to a point of 0% amplitude specified by a square mark from the fundamental amplitude specified by the circular mark as is indicated by a long broken arrow Dn_dir.

Meanwhile, in a case where the harmonic amplitude is reduced according to values of the respective parameters in S7 of FIG. 9, it is preferable to achieve both of a torque ripple reducing effect and a phase current peak reducing effect most effectively by reducing the harmonic amplitude while ensuring as large phase current peak reduction amount as possible. It is therefore preferable to reduce amplitudes of the fifth and seventh harmonic components along an optimal amplitude line as is indicated by a thick arrow Dn_opt. The fifth harmonic amplitude alone may be reduced in a range of the fifth harmonic amplitude of 5% or less where the seventh harmonic amplitude is reduced to 0%.

Further, a preferable control configuration to achieve both of the torque ripple reducing effect and the phase current peak reducing effect will be described. In FIG. 11, a polygonal region enclosed by an alternate long and short dash line and an alternate long and two short dashes line represents a linear approximation of an amplitude range of a fifth and seventh complex harmonic component with the phase current peak reduction amount exceeding 5%.

As is shown in FIG. 13A, the largest peak reduction amount when the fifth harmonic component alone is superimposed is 4.9%. Hence, a peak reduction amount exceeding 5% obtained by superimposing the fifth and seventh complex harmonic component is advantageous over a case where the fifth harmonic component alone is superimposed. A range where the phase current peak reduction amount exceeds 5% will be referred to as "an advantageous amplitude range".

The advantageous amplitude range can be said as a range of the seventh harmonic amplitude with respect to respective amplitudes of the fifth harmonic component on the optimal amplitude line with a margin comparable to the peak reduction amount of 1%.

More specifically, when the fifth harmonic amplitude is 8.1%, 12.5%, and 16.1%, an upper limit value and a lower limit value of the seventh harmonic amplitude with the phase current peak reduction amount exceeding 5% are set forth in Table 1 below.

TABLE 1

| Range where peak reduction | Fifth harmonic amplitude [%] (peak reduction amount [%]) | | |
|---|---|---|---|
| amount exceeds 5% | 8.1 | 12.5 | 16.1 |
| Seventh harmonic   Upper limit value | 3.1 (>5.0) | 7.5 (>5.0) | 11.1 (>5.0) |

TABLE 1-continued

| Range where peak reduction | | Fifth harmonic amplitude [%] (peak reduction amount [%]) | | |
|---|---|---|---|---|
| amount exceeds 5% | | 8.1 | 12.5 | 16.1 |
| amplitude [%] | Optimal value | 2.0 (≅6.0) | 5.3 (≅7.2) | 10.0 (≅6.0) |
| | Lower limit value | 0.6 (>5.0) | 3.0 (>5.0) | 7.1 (>5.0) |

The advantageous amplitude range can be approximated to a range enclosed by lines expressed by five equations, Equations (7.1) through (7.5) below, where x [%] is the fifth harmonic amplitude and y [%] is the seventh harmonic amplitude.

$$x=8.1 \quad (7.1)$$

$$x=16.1 \quad (7.2)$$

$$y=0.54x-3.8(8.1 \le x \le 12.5) \quad (7.3)$$

$$y=1.14x-11.3(12.5 \le x \le 16.1) \quad (7.4)$$

$$y=1.00x-5.0(8.1 \le x \le 16.1) \quad (7.5)$$

In the advantageous amplitude range, a range where the fifth harmonic amplitude is 12.5% or less and the seventh harmonic amplitude is 5.3% or less is indicated by an alternate long and short dash line and the other range is indicated by an alternate long and two short dashes line. The range indicated by the alternate long and short dash line is the advantageous amplitude range usable in the harmonic amplitude reduction processing. The range is defined as a combined range of x and y such that satisfy simultaneous inequalities expressed by Equations (8.1) through (8.3) as below. A point at which the fifth harmonic amplitude is 8.1% and the seventh harmonic amplitude is 2.0% on the optimal amplitude line is specified by a diamond mark.

$$8.1 \le x \le 12.5x \quad (8.1)$$

$$y \le 5.3 \quad (8.2)$$

$$(0.54x-3.8) \le y \le (1.00x-5.0) \quad (8.3)$$

Hence, in a case where both of a reduction of a torque ripple and a reduction of the phase current peak are required, it is effective to reduce the harmonic amplitude from the fundamental amplitude within the range specified above. A computation may possibly become complex to reduce the harmonic amplitude exactly along the optimal amplitude line. However, a computation can be simpler by selecting an amplitude value easy to compute within the range specified above.

In the manner as above, the harmonic amplitude to be superimposed on the phase current first harmonic component is determined finally in consideration of an optimal proportion between the torque ripple reducing effect and the phase current peak reducing effect according to values of the respective parameters in the harmonic amplitude reduction processing.

After the harmonic amplitude is determined as above, as is shown in FIG. 2, the harmonics generation portion 20 outputs peak reduction current command values Id_red1, Iq_red1, Id_red2, and Iq_red2 of a dq-axis sixth harmonic component comparable to the determined harmonic amplitude. When the harmonic amplitude is set to 0%, the peak reduction current command values are reduced to substantially 0. Dq-axis superimposition current command values Id_sup1, Iq_sup1, Id_sup2, and Iq_sup2 are calculated by adding the peak reduction current command values Id_red1, Iq_red1, Id_red2, and Iq_red2 to dq-axis current command values Id1*, Iq1*, Id2*, and Iq2*, respectively.

Figure 12:
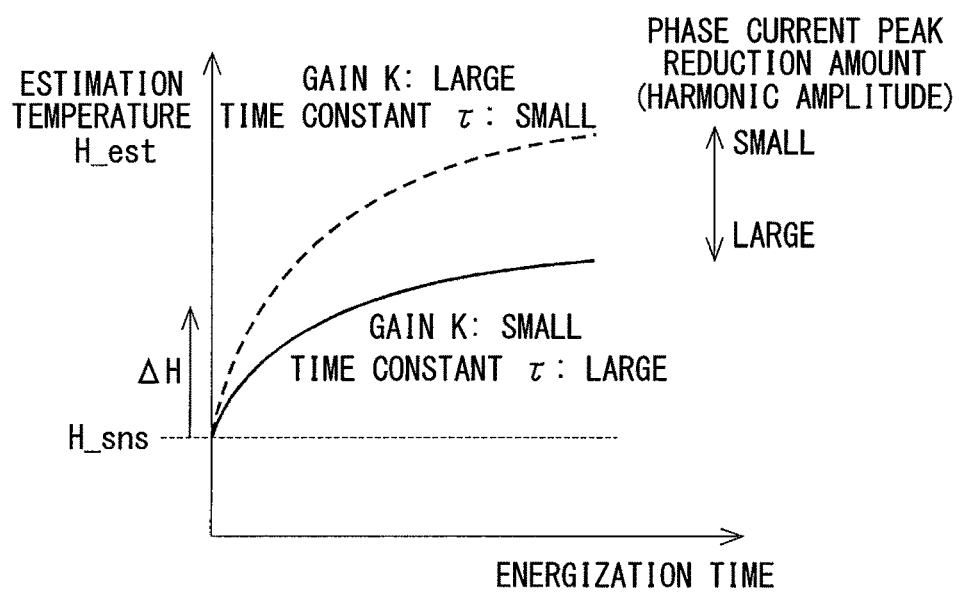
FIG. 12 is a characteristic chart showing a change in estimation temperature transient characteristics with fifth and seventh harmonic amplitudes.

A calculation of the element estimation temperature H_est, on which a result of the harmonic amplitude reduction processing is reflected, by the element temperature estimation portion 40 will now be described with reference to FIG. 12.

As has been described above with reference to FIG. 4, the dq-axis superimposition current command values Id_sup1, Iq_sup1, Id_sup2, and Iq_sup2 calculated according to amplitude of the harmonic component are input into the response constant determination part 42 in the element temperature estimation portion 40. Hence, the response constant determination part 42 is capable of acquiring information on the phrase current peak reduction amount and the harmonic amplitude.

The response constant determination part 42 increases a gain K and reduces a time constant • as the phase current peak reduction amount becomes smaller. Conversely, the response constant determination part 42 reduces the gain K and increases the time constant • as the phase current peak reduction amount becomes larger. That is, because a heat generation regulating effect sufficient to reduce the phase current peak reduction amount can no longer be obtained by the harmonic amplitude reduction processing, a temperature change amount •H is estimated larger and the element estimation temperature H_est is estimated higher for a same energization time.

As are shown in FIG. 3 and FIG. 4, the element estimation temperature H_est calculated accurately in the manner as above is notified to the current limit portion 32. The current limit portion 32 protects the switching elements 611 through 616 and 621 through 626 and the winding sets 801 and 802 against overheating by limiting the dq-axis current command values Id* and Iq* when the element estimation temperature H_est exceeds a predetermined value.

The element estimation temperature H_est may be notified to the harmonic component generation portion 20 and used as a parameter in the harmonic amplitude reduction processing. In such a case, processing in S4 of FIG. 9 is performed according to the element estimation temperature H_est.

Effects

Functions and effects of the ECU 10 of the present embodiment will now be described.

(1) The ECU 10 is capable of reducing the phase current peak value and hence reducing heat generation and a loss by superimposing the fifth and seventh harmonic components generated by the harmonic component generation portion 20 on the phase current first harmonic component. However, superimposing the harmonic components raises a problem, for example, an increase of a torque ripple as a conflicting event of the phase current peak reducing effect. In the present embodiment, sixth-order torque ripples can be cancelled out by the configuration of the inverters 601 and 602 and the winding sets 801 and 802 whereas twelfth-order torque ripples cannot be canceled out.

Hence, superimposing a harmonic component has a tradeoff relationship between a problem relating to a reduction of heat generation and a loss by reducing the phase current peak and a problem relating to a reduction of a torque ripple.

Such being the case, the harmonic component generation portion 20 performs "the harmonic amplitude reduction processing" to reduce the phase current peak reduction amount and to reduce an absolute value of amplitude of a harmonic component from the fundamental amplitude of the harmonic component generated to lower the phase current peak according to a predetermined parameter. Accordingly, appropriate processing can be performed by discriminating a case where the phase current peak is reduced preferentially from other cases depending on an operating state of the motor 80.

In short, the ECU 10 of the present embodiment is capable controlling the motor 80 to effectively exert performance in consideration of comparison between the phase current peak reducing effect and a conflicting event.

(2) The harmonic component generation portion 20 uses "a parameter relating to tradeoffs between a peak reduction of the phase current first harmonic component and a reduction of a torque ripple occurring at the motor 80 when a harmonic component is superimposed" as parameters in the harmonic amplitude reduction processing. For example, the element temperature H of the switching elements 611 through 616 and 621 through 626, the current I passed through the motor 80, the motor torque Tm, the rotation speed N, and so on can be parameters in the harmonic amplitude reduction processing. Hence, a preferable control mainly aimed at reducing a torque ripple, which is an important factor of motor performance, can be performed.

(3) The ECU 10 includes the element temperature estimation portion 40 which calculates the element estimation temperature H_est corresponding to an energization time. The response constant determination part 42 in the element temperature estimation portion 40 determines a response constant, which is the gain K and the time constant • of the first-order delay computing element 43, according to the phase current peak reduction amount. More specifically, the response constant determination part 42 increases the gain K and reduces the time constant • more as the phase current peak reduction amount becomes smaller. The element temperature estimation portion 40 is thus capable of more accurately calculating the element estimation temperature H_est by reflecting information of the phase current peak reduction amount.

(4) The current limit portion 32 obtains the element estimation temperature H_est accurately calculated by the element temperature estimation portion 40 and is therefore capable of appropriately performing the current limit according to the obtained element estimation temperature H_est. Because a need to perform the current limit by taking an estimation error into consideration is eliminated, the motor 80 is enabled to exert performance effectively.

(5) The harmonic component generation portion 20 obtains the element estimation temperature H_est accurately calculated by the element temperature estimation portion 40 as a parameter in the harmonic amplitude processing and is thus capable of performing the harmonic amplitude reduction processing more appropriately.

(6) The element temperature estimation portion 40 further has the zero rotation determination part 41 which determines the zero rotation state in which "the motor 80 is energized and a rotation of the motor 80 is stopped". When it is determined that the motor 80 is in the zero rotation state by the zero rotation determination part 41, the response constant determination part 42 determines a response constant according to the phase current peak reduction amount.

Determining whether the current limit is necessary and appropriately performing the harmonic amplitude reduction processing according to the accurate element estimation temperature H_est are more crucial particularly in the zero rotation state in which a current passes through a particular phase. Hence, by limiting the determination processing of a response constant according to the phase current peak reduction amount to be performed during zero rotation alone, a computation load applied on the element temperature estimation portion 40 can be reduced effectively.

(7) The harmonic component generation portion 20 sets the largest reduction amount amplitude with the fifth harmonic amplitude of 12.5% and the seventh harmonic amplitude of 5.3% as the fundamental amplitude in the harmonic amplitude reduction processing. Hence, in a case where the phase current peak is reduced preferentially, the peak reduction amount as large as 7.2% can be ensured.

The harmonic component generation portion 20 reduces absolute values of the fifth and seventh harmonic amplitudes from the fundamental amplitude along the optimal amplitude line in the harmonic amplitude reduction processing. Hence, in a case where the harmonic amplitude is reduced according to values of the respective parameters, both of the torque ripple reducing effect and the phase current peak reducing effect can be achieved most efficiently by reducing the harmonic amplitude while ensuring as large phase current peak reduction amount as possible.

Further, by reducing the harmonic amplitude within the advantageous amplitude range, an advantage of the phase current peak reducing effect can be secured over a case where the fifth harmonic alone is superimposed.

(8) It is necessary for the electric power steering apparatus 90 assisting the driver in a steering operation to pass through a large current by the compact ECU 10 due to a limited installation space. A need to reduce heat generation and a loss by reducing the phase current peak is significant particularly during zero rotation and low-speed rotation. Meanwhile, noises and vibrations caused by a torque ripple have a large influence on a steering feeling of the driver and a product quality and a need to reduce a torque ripple is significant. It is also crucial to perform the current limit exactly by accurately estimating a temperature of the switching elements 611 through 616 and 621 through 626. Hence, the effects described above of the present embodiment are exerted particularly effectively.

Second and Third Embodiments

Figure 13B:
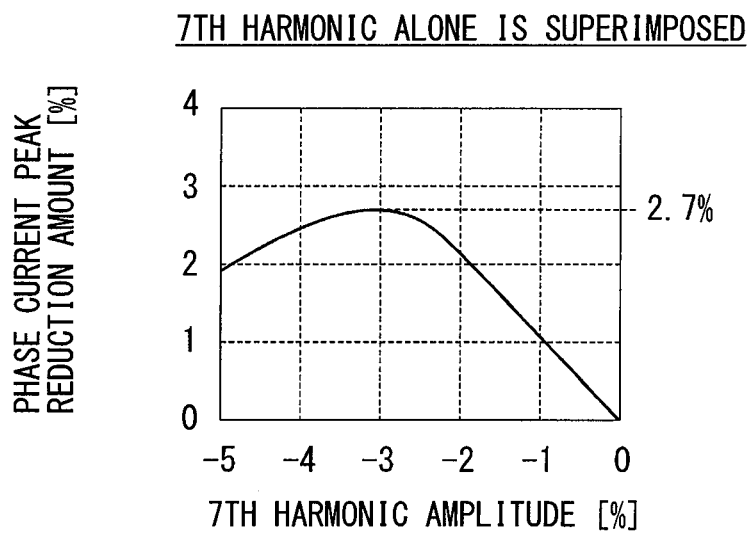

Second and third embodiments will be described with reference to FIG. 13A, FIG. 13B, and FIG. 14. In the second embodiment, a phase current fifth harmonic component alone is superimposed on a phase current first harmonic component as a harmonic. In the third embodiment, a phase current seventh harmonic component alone is superimposed on a phase current first harmonic component as a harmonic.

As is shown in FIG. 13A, a phase current peak reduction amount becomes as large as 4.9% when fifth harmonic amplitude is approximately 5% in the second embodiment. Also, as is shown in FIG. 13B, the phase current peak reduction amount becomes as large as 2.7% when seventh harmonic amplitude is approximately −3% in the third embodiment.

Values of "5%" of the fifth harmonic amplitude and "−3%" of the seventh harmonic amplitude are used as fundamental amplitude in harmonic amplitude reduction processing in the second and third embodiments, respectively.

Figure 14:
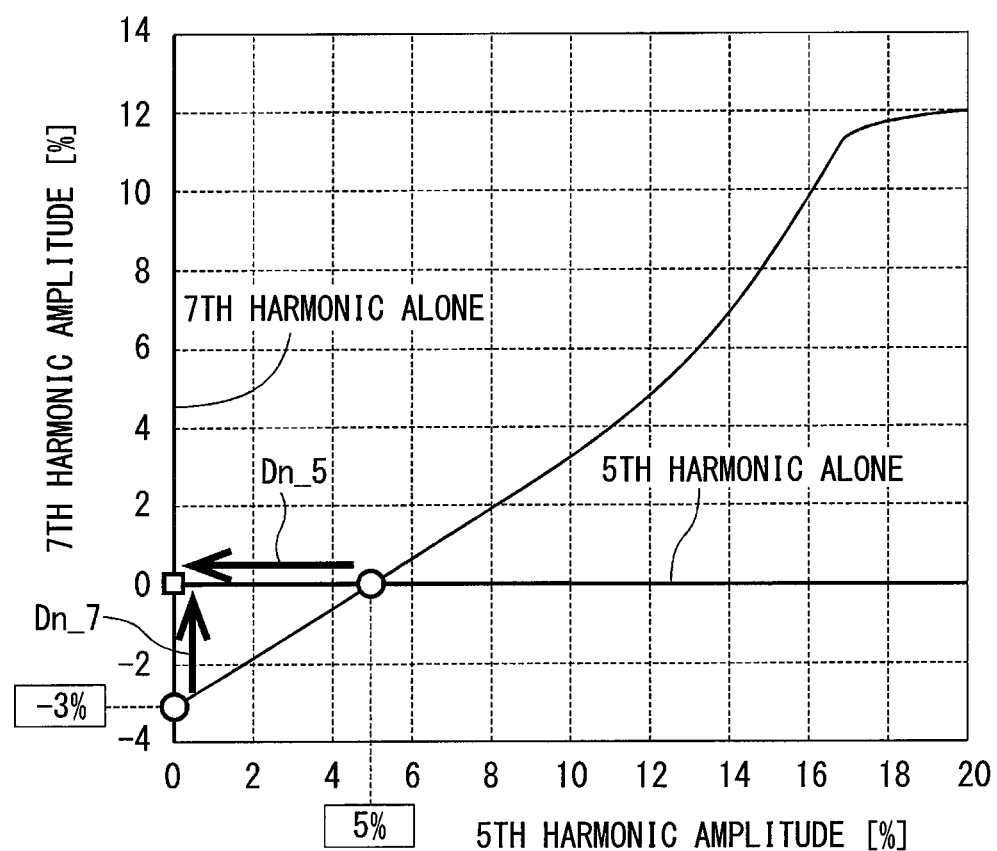
FIG. 14 is a characteristic chart showing the harmonic amplitude reduction processing when a fifth harmonic alone is a harmonic component and when a seventh harmonic alone is a harmonic component.

As is specified by a circular mark of FIG. 14, the values correspond to the fifth harmonic amplitude when the seventh harmonic amplitude is 0% and to the seventh harmonic amplitude when the fifth harmonic amplitude is 0% on an optimal amplitude line. In a case where an absolute value of harmonic amplitude is reduced according to values of respective parameters in the harmonic amplitude reduction processing, the harmonic component generation portion 20 reduces the absolute value of the harmonic amplitude from the fundamental amplitude toward a point of 0% amplitude specified by a square mark as is indicated by thick arrows Dn_5 and Dn_7.

Accordingly, effects same as the effects of the first embodiment above can be also achieved in the second and third embodiments.

Other Embodiments (a) In a computation of the peak reduction current command value by the harmonic component generation portion 20, a sixth harmonic component is superimposed on the dq-axis current command value in the embodiments above. Such a configuration corresponds to the third embodiment (FIG. 12) of Japanese Patent No. 5672278. Beside such a configuration, for example, a configuration to apply dq transformation to fifth and seventh harmonics and a configuration to perform a feedback control by using a difference from a sum of the dq-axis current command values corresponding to the first, second, and fourth embodiments (FIG. 5, FIG. 11, FIG. 13A, and FIG. 13B) of Japanese Patent No. 5672278 can be also adopted.

(b) In the embodiments above, an increase of a torque ripple is focused and mainly used as a conflicting event of the phase current peak reducing effect achieved by superimposing a harmonic component on the phase current first harmonic component, and the harmonic amplitude reduction processing is performed according to parameters relating to a torque ripple. In addition, for example, an increase of a computation load may be focused as a conflicting event of the phase current peak reducing effect. That is, it may be configured in such a manner that a computation to superimpose a harmonic component is performed when the number of other control computations performed at a time by the control unit 65 is small whereas a computation to superimpose a harmonic component is not performed when the number of other control computations is large.

(c) In the embodiments above, the response constant determination part 42 of the element temperature estimation portion 40 determines a response constant according to the phase current peak reduction amount when the zero rotation determination part 41 determines that the motor 80 is in the zero rotation state. However, the rotation determination part 41 may not be provided to an element temperature estimation portion of other embodiments and a response constant may be determined by the response constant determination part 42 according to the phase current peak reduction amount also when the motor 80 is in a normal rotation state.

(d) In the configuration of FIG. 1 shown by way of example, one temperature senor 75 is provided for the inverters 601 and 602 mounted on the same circuit board. However, when a condition, such as a space, permits, twelve temperature sensors may be provided to the multiple switching elements 611 through 616 and 621 through 626 of the two systems in a one-to-one correspondence to perform the current limit by directly detecting present element temperatures. In such a case, the ECU 10 may not include the element temperature estimation portion 40.

(e) In addition to or instead of the respective parameters, such as the rotation speed N, the element temperature H, the motor torque Tm, and the current I, specified in the embodiments above by way of example, other parameters relating to an operating state of the motor 80 or the like may be used to make a determination in the harmonic amplitude reduction processing.

(f) Specific configurations of the control apparatus for a three-phase rotary machine are not limited to the configurations of the embodiments above as shown in FIG. 1 and FIG. 3 by way of example. For example, switching elements of inverters may be field effect transistors, IGBTs, or the like instead of MOSFETs.

(g) Applications of the control apparatus for a three-phase rotary machine of the present disclosure are not limited to the control apparatus of the steering assist motor in the electric power steering apparatus, and the control apparatus may be applied also to other three-phase motors or control apparatus for a motor.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control apparatus for controlling an operation of a three-phase rotary machine having two sets of three-phase windings, the control apparatus for the three-phase rotary machine comprising:

two power converters that respectively correspond to the two sets of the windings, and output AC currents, having a same amplitude and a phase difference of (30±60×n)[deg] between AC currents, to the two sets of the windings according to operations of a plurality of switching elements, n being an integer;

a harmonic component generator that generates at least one of a phase current fifth harmonic component having a frequency five times higher than a frequency of a phase current first harmonic component of a current command value flowing through the three-phase rotary machine and a phase current seventh harmonic component having a frequency seven times higher than the frequency of the phase current first harmonic component, as a harmonic component to be superimposed on the phase current first harmonic component; and two controllers that respectively calculates voltage command values for the two power converters according to the current command value obtained by superimposing the harmonic component on the phase current first harmonic component, wherein:

a combination of an amplitude of the phase current fifth harmonic component and an amplitude of the phase current seventh harmonic component generated by the harmonic component generator to reduce a peak of the phase current first harmonic component is defined as a fundamental amplitude; and the harmonic component generator performs a harmonic amplitude reduction process to reduce a phase current peak reduction amount, which is a peak reduction amount of the phase current first harmonic component, from the fundamental amplitude according to a predetermined parameter, and to reduce an absolute value of an amplitude of the harmonic component.

2. The control apparatus for a three-phase rotary machine according to claim 1, wherein:
the harmonic component generator uses a parameter, relating to a tradeoff relationship between a reduction of the peak of the phase current first harmonic component and a reduction of a torque ripple generated in the three-phase rotary machine when the harmonic component is superimposed, as the predetermined parameter of the harmonic amplitude reduction process.

3. The control apparatus for a three-phase rotary machine according to claim 1, wherein:
the harmonic component generator performs the harmonic amplitude reduction process when an element temperature of the switching elements is equal to or lower than a predetermined temperature threshold or when a current flowing through the three-phase rotary machine is equal to or lower than a predetermined current threshold.

4. The control apparatus for a three-phase rotary machine according to claim 1, wherein:
the harmonic component generator performs the harmonic amplitude reduction process when a motor torque of the three-phase rotary machine is equal to or larger than a predetermined torque threshold.

5. The control apparatus for a three-phase rotary machine according to claim 1, wherein:
the harmonic component generator performs the harmonic amplitude reduction process when a rotation speed of the three-phase rotary machine is equal to or higher than a predetermined rotation speed threshold.

6. The control apparatus for a three-phase rotary machine according to claim 1, further comprising:
an element temperature estimator having:
a first-order delay calculator that calculates a first-order delay response using a gain and a time constant in response to an input of a current square value of a current relating to energization of the three-phase rotary machine or an input of a time average of an integrated value of the current square value, and outputs the first-order delay response as a temperature change amount;
a response constant determiner that determines a response constant, which is the gain and the time constant of the first-order delay calculator, according to the phase current peak reduction amount; and
an adder that adds the temperature change amount to an element detection temperature of the switching elements detected by one or more temperature sensors, and outputs an addition result as an element estimation temperature of the switching elements.

7. The control apparatus for a three-phase rotary machine according to claim 6, wherein:
the response constant determiner increases the gain and reduces the time constant as the phase current peak reduction amount becomes smaller.

8. The control apparatus for a three-phase rotary machine according to claim 7, further comprising:
a current limiter that limits the current command value according to the element estimation temperature calculated by the element temperature estimator.

9. The control apparatus for a three-phase rotary machine according to claim 7, wherein:
the harmonic component generator uses the element estimation temperature calculated by the element temperature estimator as the parameter of the harmonic amplitude reduction process.

10. The control apparatus for a three-phase rotary machine according to claim 7, wherein:
the element temperature estimator further includes a zero rotation determiner that determines a zero rotation state in which the three-phase rotary machine is energized and a rotation of the three-phase rotary machine is stopped; and
the response constant determiner determines the response constant according to the phase current peak reduction amount when the zero rotation determiner determines that the three-phase rotary machine is in the zero rotation state.

11. The control apparatus for a three-phase rotary machine according to claim 1, wherein:
the harmonic component generator generates a harmonic component by combining the phase current fifth harmonic component and the phase current seventh harmonic component, and sets a largest reduction amount amplitude, which is a combination of an amplitude of the phase current fifth harmonic of 12.5% and an amplitude of the phase current seventh harmonic of 5.3% and at which the phase current peak reduction amount becomes a largest amount, as the fundamental amplitude.

12. The control apparatus for a three-phase rotary machine according to claim 11, wherein:
in the harmonic amplitude reduction process, the harmonic component generator reduces an absolute value of the amplitude of the phase current fifth harmonic component and an absolute value of the amplitude of the phase current seventh harmonic component from the fundamental amplitude according to an optimal amplitude line, which is provided by combining the amplitude of the phase current seventh harmonic component with each amplitude of the phase current fifth harmonic component to maximize the phase current peak reduction amount.

13. The control apparatus for a three-phase rotary machine according to claim 12, wherein:
in the harmonic amplitude reduction process, when a rotation speed of the three-phase rotary machine is lower than a predetermined rotation threshold, the harmonic component generator generates the harmonic component according to a combination of the amplitudes in a range where:
the amplitude of the phase current fifth harmonic is defined as x;
the amplitude of the phase current seventh harmonic is defined as y;
x is expressed in a percentage, and y is expressed in a percentage;
x and y satisfy a simultaneous inequality of:

$8.1 \leq x \leq 12.5;$ $y \leq 5.3;$ and $(0.54x-3.8) \leq y \leq (1.00x-5.0).$ 14. An electric power steering apparatus comprising:
a three-phase rotary machine that generates an assist torque for assisting a driver in a steering operation;
the control apparatus for the three-phase rotary machine according to claim 1; and a transmission apparatus that transmits the assist torque output from the three-phase rotary machine to a steering shaft.

* * * * *